(12) United States Patent
Kotaka

(10) Patent No.: US 9,762,926 B2
(45) Date of Patent: Sep. 12, 2017

(54) IMAGE PROCESSING DEVICE AND IMAGE PROCESSING METHOD, PROGRAM, AND IMAGING APPARATUS

(71) Applicant: SONY CORPORATION, Minato-Ku (JP)

(72) Inventor: Naohiko Kotaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 547 days.

(21) Appl. No.: 14/267,245

(22) Filed: May 1, 2014

(65) Prior Publication Data
US 2014/0362920 A1 Dec. 11, 2014

(30) Foreign Application Priority Data

Jun. 11, 2013 (JP) ................................ 2013-123122

(51) Int. Cl.
*H04N 19/527* (2014.01)
*H04N 19/436* (2014.01)

(52) U.S. Cl.
CPC ......... *H04N 19/527* (2014.11); *H04N 19/436* (2014.11)

(58) Field of Classification Search
CPC ...................... H04N 19/00593; H04N 19/527
USPC ................................................... 375/240.16
See application file for complete search history.

(56) References Cited

U.S. PATENT DOCUMENTS

| | | | |
|---|---|---|---|
| 5,646,687 A | 7/1997 | Botsford, III et al. | |
| 6,553,068 B1 | 4/2003 | Wake et al. | |
| 8,170,120 B2 | 5/2012 | Fuchie et al. | |
| 2002/0015513 A1* | 2/2002 | Ando | H04N 19/139 |
| | | | 382/107 |
| 2007/0133678 A1 | 6/2007 | Sakai | |
| 2013/0243092 A1* | 9/2013 | Sugio | H04N 19/52 |
| | | | 375/240.16 |

FOREIGN PATENT DOCUMENTS

| JP | 2011-211498 | 10/2011 |
|---|---|---|
| JP | 2012-253516 | 12/2012 |

OTHER PUBLICATIONS

U.S. Appl. No. 14/278,037, filed May 15, 2014, Kotaka.

* cited by examiner

*Primary Examiner* — Christopher S Kelley
*Assistant Examiner* — Jonathan Messmore
(74) *Attorney, Agent, or Firm* — Oblon, McClelland, Maier & Neustadt, L.L.P.

(57) ABSTRACT

An image processing device includes: a division unit that divides each picture of image data into multiple arrangements; multiple coding units, each of which codes the pictures in the mutually-different arrangements that result from the division by the division unit; and a composition unit that composites streams in the arrangements, which are obtained by each of the multiple coding units coding each picture, in which when coding a current picture, the coding unit performs inter-prediction using a first global motion vector (GMV) that is derived from motion information on a portion whose processing is finished, of a picture that precedes the current picture in the image data that is present before being divided by the division unit and whose processing is in progress in a different coding unit.

17 Claims, 15 Drawing Sheets

[pseudo code]
gmv : current pic GMV
gmv = GMV(0)
speculative_gmv    = gmv
search_area_offset = gmv

[pseudo code]
gmv : current pic GMV
gmv = GMV(0) × poc_diff
speculative_gmv  = gmv
search_area_offset = gmv

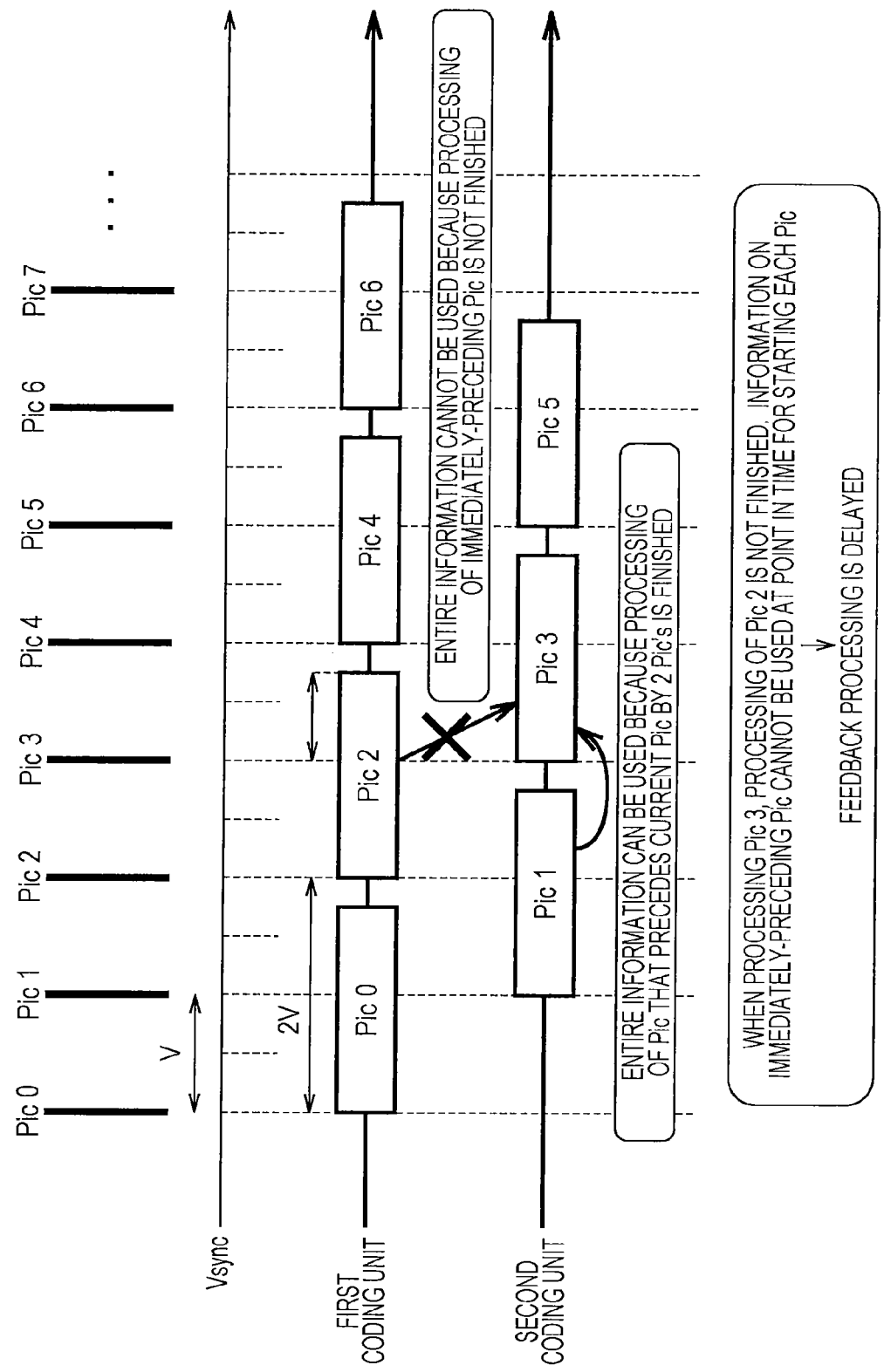

BECAUSE GMV(0) IS NOT COMPLETED, GMV(1) IS USED
↓
DELAY OCCURS BY PERFORMING FRAME PARALLELIZATION

[pseudo code]
gmv : current pic GMV
gmv = GMV(1) × poc_diff
speculative_gmv = gmv
search_area_offset = gmv

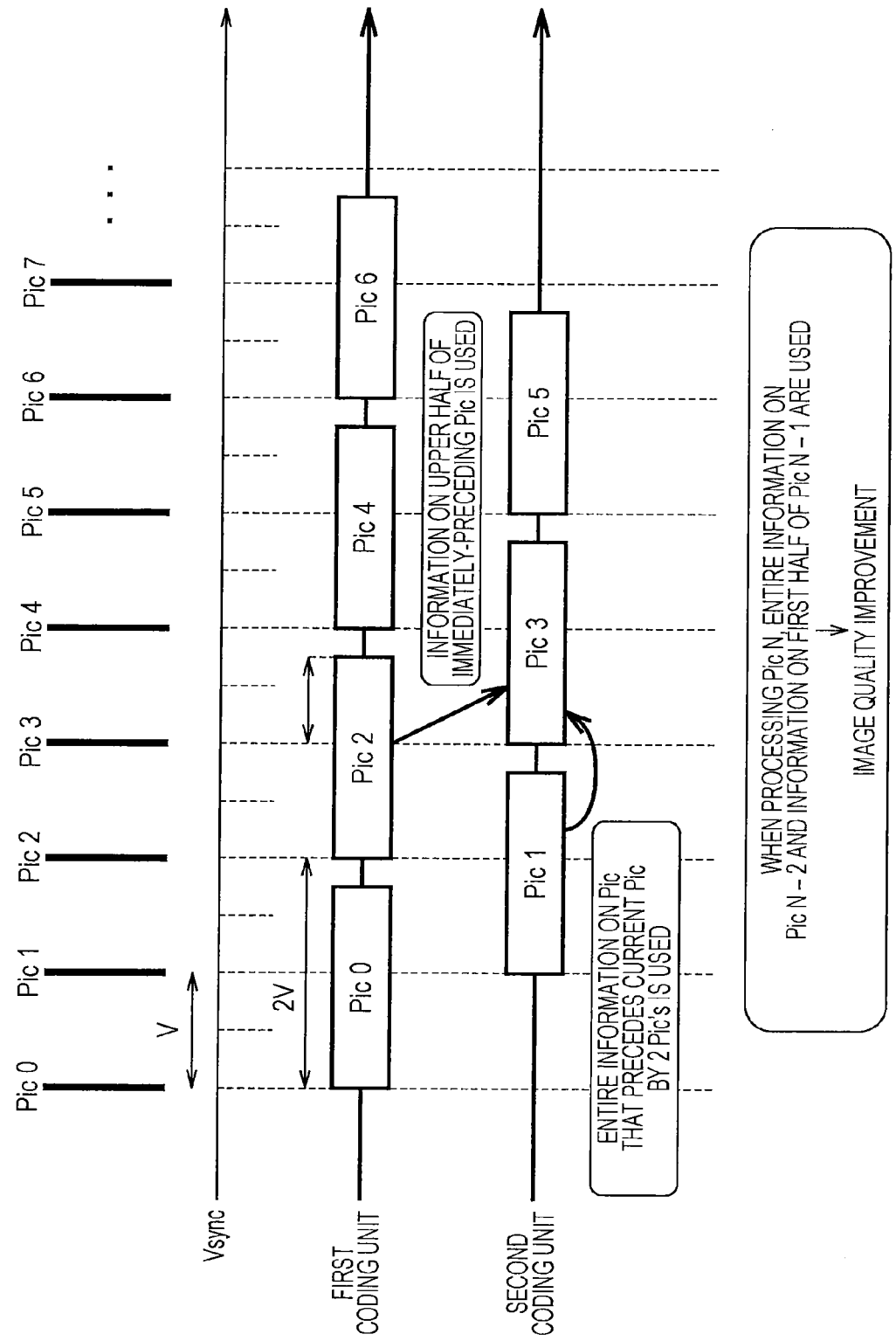

[pseudo code]
speculative_gmv_t = GMV_t(0)
speculative_gmv_b = GMV_b(0)
search_area_offset = (GMV_t(0) + GMV_b(0))/2

GMV_t(0), GMV_t(1), AND GMV_b(1) ARE USED
DIFFERENCE IN MOTION IN TOP IS REFLECTED IN THE ENTIRETY

```
[pseudo code]
speculative_gmv_t = GMV_t(0)
speculative_gmv_b = GMV_b(0)
search_area_offset = (GMV_t(1) + GMV_b(1))/2 + GMV_t(0) − GMV_t(1)
               = (GMV_b(1) − GMV_t(1))/2 + GMV_t(0)
```

IMAGE PROCESSING DEVICE AND IMAGE
PROCESSING METHOD, PROGRAM, AND
IMAGING APPARATUS

CROSS REFERENCE TO RELATED
APPLICATIONS

This application claims the benefit of Japanese Priority Patent Application JP 2013-123122 filed Jun. 11, 2013, the entire contents of which are incorporated herein by reference.

BACKGROUND

The present disclosure relates to an image processing device, an image processing method, a program, and an imaging apparatus, and particularly to an image processing device, an image processing method, a program, and an imaging apparatus, which are capable of suppressing a reduction in image quality due to coding of an image.

In the related art, there is a method in which parallel processing is performed, for example, in a picture unit using multiple encoders in coding a moving image (for example, refer to Japanese Unexamined Patent Application Publication Nos. 2012-253516, 2007-16619 (Corresponding U.S. Patent Application Publication No. US 2007/0133678), 10-313463 (Corresponding U.S. Pat. No. 6,553,068), and 8-265164 (Corresponding U.S. Pat. No. 5,646,687).

SUMMARY

However, if the coding is performed in parallel in this manner, with a method in the related art, there is a likelihood that processing of a picture that precedes a current picture that is a processing target in a certain encoder will be in coding progress in a different encoder. In that case, a global motion vector (GMV) is difficult to derive using motion information on the picture whose coding processing is in progress and the GMV has to be derived using the motion information on a picture that is older than such a picture. Because of this, GMV precision is reduced and there is a concern that GMV precision will be reduced and the image quality deterioration will increase.

It is desirable to suppress a reduction in image quality due to coding of an image.

According to an embodiment of the present disclosure, there is provided an image processing device including: a division unit that divides each picture of image data into multiple arrangements; multiple coding units, each of which codes the pictures in the mutually-different arrangements that result from the division by the division unit; and a composition unit that composites streams in the arrangements, which are obtained by each of the multiple coding units coding each picture, in which when coding a current picture, the coding unit performs inter-prediction using a first global motion vector (GMV) that is derived from motion information on a portion whose processing is finished, of a picture that precedes the current picture in the image data that is present before being divided by the division unit and whose processing is in progress in a different coding unit.

In the image processing device, if processing of a picture, among pictures that are nearest a reference distance for a GMV, that is nearest the current picture is in progress in the different coding unit, the coding unit may derive the first GMV from the motion information on the portion whose processing is finished, of the picture.

In the image processing device, if the processing of a picture corresponding to the first GMV is in progress at a point in time for starting the coding of the current picture, the coding unit may derive the first GMV from the motion information on the portion whose processing is finished.

In the image processing device, the coding unit may derive a search area offset of the inter-prediction using the first GMV.

In the image processing device, the coding unit may derive the search area offset using a GMV that is derived from the motion information on an entire picture that precedes a picture corresponding to the first GMV, in the image data that is present before being divided by the division unit and whose coding is finished in the coding unit itself or the different coding unit.

In the image processing device, the coding unit derives the search area offset using both of a second GMV that is derived from the motion information on a portion corresponding to the portion whose processing is finished, of the picture corresponding to the first GMV, of the picture whose coding is finished, and a third GMV that is derived from the motion information on a portion different from the portion corresponding to the portion whose processing is finished, as the GMV that is derived from the motion information on the entire picture.

In the image processing device, the coding unit may derive the search area offset by adding a difference between the first GMV and the second GMV to an average of the second GMV and the third GMV.

In the image processing device, the division unit may divide the picture of the image data into two arrangements, an even-numbered picture arrangement and an odd-numbered picture arrangement, in which each of the coding units may code each picture in the arrangement corresponding to the coding unit itself during a vertical synchronization period for two pictures, in which at the time of the coding, each of the coding units may derive the first GMV from the motion information on an upper half of a picture that precedes the current picture in the image data that is present before being divided by the division unit and whose processing is in progress in the different coding unit, and may derive the second GMV from the motion information on an upper half of a picture that precedes the picture corresponding to the first GMV in the image data that is present before being divided by the division unit and whose coding is finished in the coding unit itself and the different coding unit, and the third GMV from the motion information on a lower half of the picture, in which each of the coding units may derive the search area offset of the current picture using the first GMV to the third GMV and may perform the inter-prediction using the derived search area offset, and in which the composition unit may composite a stream in the even-numbered picture arrangement and a stream in the odd-numbered picture arrangement, which are generated by each coding unit, and may generate an output stream.

In the image processing device, the coding unit may derive the first GMV from the motion information on the upper half of a picture whose processing is in progress when starting the coding of the current picture and that precedes the current picture by one picture, and may derive the second GMV from the motion information on an upper half of a picture whose processing is in progress when starting the coding of the current picture and that precedes the current picture by two or more pictures, and the third GMV from the motion information on a lower half of the picture.

In the image processing device, the coding unit may derive the second GMV from the motion information on an upper half of a picture that precedes the current picture by three pictures, and the third GMV from the motion information on a lower half of the picture.

In the image processing device, the coding unit may derive a first starting point that is a starting point for a speculative execution point of the inter-prediction for a portion corresponding to the portion whose processing is finished, of the picture corresponding to the first GMV, of the current picture using the first GMV.

In the image processing device, the coding unit may set the first GMV to be the first starting point.

In the image processing device, after processing a portion corresponding to the portion whose processing is finished, of a picture corresponding to the first GMV, of the current picture, using a second GMV that is derived from the motion information on a portion different from the portion corresponding to the portion whose processing is finished, of the picture corresponding to the first GMV, the coding unit may derive a second starting point that is a starting point for a speculative execution point of the inter-prediction for a portion corresponding to the different portion of the picture corresponding to the first GMV is derived, of the current picture.

In the image processing device, the coding unit may set the second GMV to be the second starting point.

In the image processing device, the division unit may divide the picture of the image data into two arrangements, an even-numbered picture arrangement and an odd-numbered picture arrangement, in which each of the coding units may code each picture in the arrangement corresponding to the coding unit itself during a vertical synchronization period for two pictures, in which when starting the coding processing on the current picture, each of the coding units may derive the first GMV from the motion information on an upper half of a picture that precedes the current picture in the image data that is present before being divided by the division unit and whose processing is in progress in the different coding unit, may derive the first starting point using the first GMV, may perform the inter-prediction on an upper half of the current picture using the first starting point, may derive the second GMV from the motion information on a lower half of a picture corresponding to the first GMV, whose processing is finished after processing the upper half, may derive the second starting point using the first GMV, and may perform the inter-prediction on the lower half of the current picture using the second starting point, and in which the composition unit may composite a stream in the even-numbered picture arrangement and a stream in the odd-numbered picture arrangement, which are generated by each coding unit, and may generate an output stream.

In the image processing device, the coding unit may derive the first GMV from the motion information on an upper half of a picture that precedes the current picture by one picture, and the second GMV from the motion information on a lower half of the picture.

According to another embodiment of the present disclosure, there is provided an image processing method including: dividing each picture of image data into multiple arrangements; coding the picture in each of the arrangements that result from the division; performing an inter-prediction on a current picture using a first global motion vector (GMV) that is derived from motion information on a portion whose processing is finished, of a picture that precedes the current picture in the image data that is present before being divided and whose processing is in progress in a different coding unit in coding the each picture; and compositing streams in the arrangements, which are obtained by coding each picture.

According to still another embodiment of the present disclosure, there is provided a program for causing a computer to perform: dividing each picture of image data into multiple arrangements; coding the picture in each of the arrangements that result from the division; performing an inter-prediction on a current picture using a first global motion vector (GMV) that is derived from motion information on a portion whose processing is finished, of a picture that precedes the current picture in the image data that is present before being divided and whose processing is in progress in a different coding unit in coding the each picture; and compositing streams in the arrangements, which are obtained by coding each picture.

According to further still another embodiment of the present disclosure, there is provided an imaging apparatus including: an imaging unit that images a photographic subject; a division unit that divides each picture of image data, which is obtained by the imaging unit imaging the photographic subject, into multiple arrangements; multiple coding units, each of which codes the pictures in the mutually-different arrangements that result from the division by the division unit; and a composition unit that composites streams in the arrangements, which are obtained by each of the multiple coding units coding each picture, in which when coding a current picture, the coding unit performs inter-prediction using a first global motion vector (GMV) that is derived from motion information on a portion whose processing is finished, of a picture that precedes the current picture in the image data that is present before being divided by the division unit and whose processing is in progress in the different coding unit.

According to the embodiment of the present disclosure, each picture of image data is divided into multiple arrangements, the picture in each of the arrangements that result from the division is coded, and an inter-prediction is performed on a current picture using a first global motion vector (GMV) that is derived from motion information on a portion whose processing is finished, of a picture that precedes the current picture in the image data that is present before being divided and whose processing is in progress in a different coding unit in coding the each picture, and streams in the arrangements, which are obtained by coding each picture are composited.

According to the embodiment of the present disclosure, a photographic subject is imaged, each picture of image data that is obtained by the imaging of the photographic subject is divided into multiple arrangements, the picture in each of the arrangements that result from the division is coded, and an inter-prediction is performed on a current picture using a first global motion vector (GMV) that is derived from motion information on a portion whose processing is finished, of a picture that precedes the current picture in the image data that is present before being divided and whose processing is in progress in a different coding unit in coding the each picture and streams in the arrangements, which are obtained by coding each picture are composited.

According to the present disclosure, an image can be processed. Particularly, the reduction in image quality due to the coding of the image can be suppressed.

BRIEF DESCRIPTION OF THE DRAWINGS

FIG. 3 is a diagram describing an example of a state of parallel coding.

FIG. 5 is a diagram describing another example of the state of the parallel coding.

DETAILED DESCRIPTION OF EMBODIMENTS

Embodiments according to the present disclosure (hereinafter referred to as embodiments) are described below. An order in which descriptions are provided is as follows.

1. Description of an Example of a State of GMV Derivation
2. First Embodiment (Image Coding Device)
3. Second Embodiment (Computer)
4. Third Embodiment (Imaging Apparatus)

1. Description of an Example of a State of GMV Derivation

First GMV Derivation Example

There is a method of using a global motion vector (GMV) when generating a prediction image by an inter-prediction (inter-screen prediction) in image coding.

A GMV is a motion vector indicating a motion of an entire picture. More specifically, for example, the GMV is the motion vector whose frequency is the highest among the motion vectors in the picture, which are generated every macroblock.

For example, a GMV is used also in a base point of a search for the motion vector (a starting point for a speculative execution point) or a movement (offset) of a search area on which the search for the motion vector is performed, in motion prediction of a frame from which the GMV is derived, a frame that is processed later in time than a field, or the field. Basically, the GMV predicts the motion vector with some precision at a point in time for starting the motion prediction. By using the GMV in this manner, it can be expected that the search for the motion vector is performed with higher efficiency.

Histograms of the motion vector are added up in the entire picture, and for example, the motion vector whose frequency is the highest is selected as the GMV. In this GMV derivation processing, there is a heavy load for the generation of the histogram, the search for the motion vector whose frequency is high, or the like.

The GMV is derived using motion information on an entire picture that is near a reference distance and that is near the current picture which is the processing target.

Figures 1A, 1B:
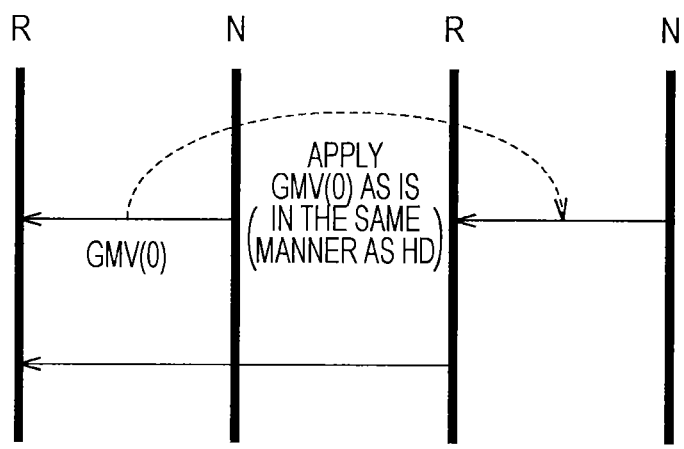
FIGS. 1A and 1B are diagrams illustrating an example of a state of GMV derivation from a Non-Ref picture.

For example, in image data, if a reference picture (Ref P) that is referred to by the following picture and a non-reference picture (Non-Ref P) that is not referred to are repeated alternately, when the current picture (CurP) that is the processing target is the non-reference picture (N), GMV (0) on the immediately-preceding non-reference picture (N), as is, is applied to the GMV as illustrated in FIG. 1A. Basically, as illustrated in FIG. 1B, the GMV on the current picture is derived using the motion information on the entire immediately-preceding non-reference picture (N). Therefore, GMV(0) on the immediately-preceding non-reference picture (N), as is, is applied to the starting point for the speculative execution point (speculative_gmv) for the current picture, or the offset of the search area (search_area_offset) (is derived using the motion information on the entire immediately-preceding non-reference picture (N)).

Figures 2A, 2B:
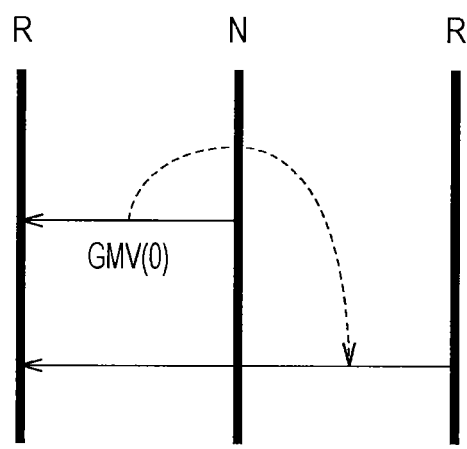
FIGS. 2A and 2B are diagrams illustrating an example of a state of the GMV derivation from a Ref picture.

Furthermore, when the current picture (CurP) is the reference picture (R), GMV, as illustrated in FIG. 2A, is derived using GMV(0) on the immediately-preceding non-reference picture (N). Basically, as illustrated in FIG. 2B, GMV (0) on the immediately-preceding non-reference picture (N) is adjusted according to a distance between the pictures. That is, also in this case, the GMV on the current picture is derived using the motion information on the entire immediately-preceding non-reference picture (N). The starting point for the speculative execution point (speculative_gmv) for the current picture or the offset of the search area (search_area_offset) is also derived in the same manner using GMV (0) on the immediately-preceding non-reference picture (N) (the motion information on the entire immediately-preceding non-reference picture (N)).

Second GMV Derivation Example

Incidentally, there is a method in which parallel processing is performed, for example, in a picture unit, using multiple encoders in moving image coding, as disclosed in Japanese Unexamined Patent Application Publication Nos. 2012-253516, 2007-166192 (Corresponding U.S. Patent Application Publication No. US 2007/0133678), 10-313463 (Corresponding U.S. Pat. No. 6,553,068), and 8-265164 (Corresponding U.S. Pat. No. 5,646,687).

For example, as illustrated in FIG. 3, a first coding unit and a second coding unit are used for coding. That is, the even-numbered picture of the image data on the moving image (also referred to an "even-numbered image") is coded by the first coding unit, and the odd-numbered picture (also referred to an "odd-numbered image") is coded by the second coding unit. Then, the first coding unit and the second coding unit are set to code each picture within a vertical synchronization period (2V) for two pictures.

In this case, as illustrated in FIG. 3, at a point in time for starting processing of the current picture, processing (coding) of the immediately-preceding picture is in progress. Therefore, the GMV is difficult to derive using the motion information on the immediately-preceding entire picture. For example, if a third picture (Pic 3) is set to be the current picture, because the processing of the second picture (Pic 2) is in progress, the GMV is difficult to derive using the moving information on the entire second picture (Pic 2). When the moving information on the entire second picture (Pic 2) is set to be used, the processing waits until the processing of Pic 1 is finished, an unnecessary delay occurs, and there is a concern that coding processing will fail without catching up with the image data (frame rate).

In contrast, because the processing (the coding) of the picture that precedes the current picture by two or more pictures is finished at a point in time for starting the processing of the current picture, the motion information on such an entire picture can be used. For example, if the third picture (Pic 3) is set to be the current picture, because the processing of the first picture (Pic 1) or the 0-th picture (Pic 0) is finished, the GMV can be derived using the information on such an entire picture.

Basically, when the current picture (CurP) is the non-reference picture (N), the GMV can be derived in the same manner as illustrated in FIGS. 1A and 1B.

Figures 4A, 4B:
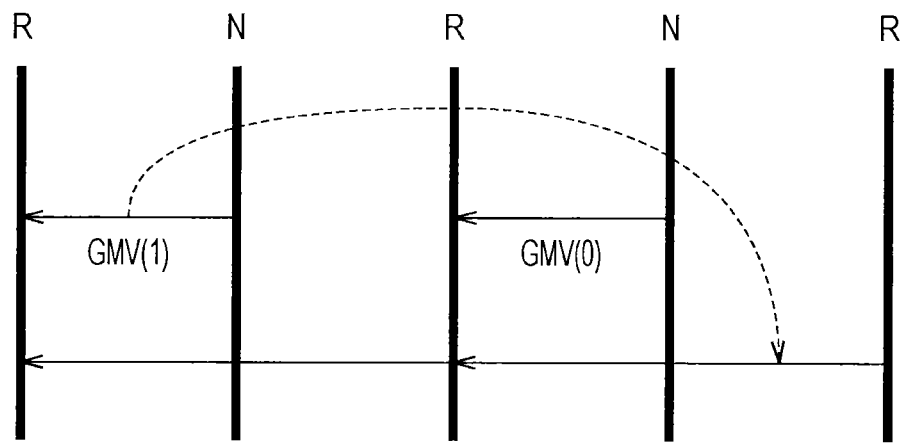
FIGS. 4A and 4B are diagrams illustrating another example of the state of GMV derivation from the Ref picture.

However, when the current picture (CurP) is the reference picture (R), because the deriving of GMV (0) on the immediately-preceding non-reference picture (N) is not completed as illustrated in FIGS. 4A and 4B, the GMV is derived using GMV (1) on the non-reference picture (N) that precedes the current picture (CurP) by one picture. Basically, since the picture, the motion information on which is used in the deriving of the GMV, is remote from the current picture, there is a concern that GMV precision will be reduced and deterioration in image quality will be increased.

Third GMV Derivation Example

Incidentally, if the image coding is performed in this manner through parallel processing, the GMV is derived using the motion information on a portion whose processing is finished, of the picture whose processing is in progress, and is used in the coding. For example, as illustrated in FIG. 5, if the coding is performed through parallelization in the same manner as illustrated in FIG. 3, when the GMV is derived using the motion information on the immediately-preceding picture, the motion information on a portion (for example, an upper half) whose processing is finished at a point in time for starting the processing of the current picture, of the immediately-preceding picture is set to be used. In other words, the GMV is derived without using the motion information on a portion whose processing is not finished at a point in time for starting the processing of the current picture, of the immediately-preceding picture.

When done in this manner, even though the coding is performed through the parallelization, since the GMV is derived using the motion information on the picture that is near the current picture, the reduction in the GMV precision can be suppressed. That is, a reduction in image quality due to the coding can be suppressed.

Moreover, at that time, the GMV may be derived using not only the motion information on the picture of which processing is in progress, but also the motion information on the entire picture that precedes the current picture by two or more pictures. When done in this manner, the reduction in the GMV precision can be further suppressed, and the reduction in image quality due to the coding can be further suppressed.

Figures 6A, 6B:
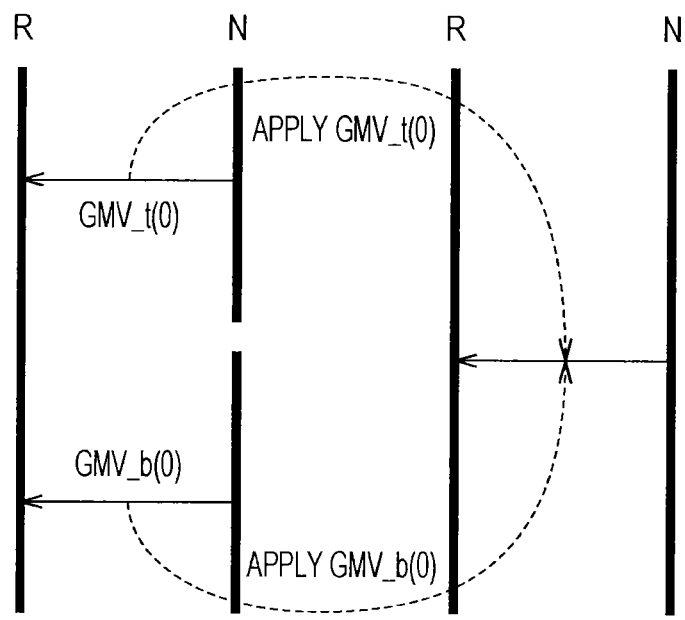
FIGS. 6A and 6B are diagrams illustrating another example of the state of the GMV derivation from the Non-Ref picture.

For example, in the image data, when the current picture (CurP) is the non-reference picture (N), the processing of the immediately-preceding non-reference picture (N) is finished. Therefore, as illustrated in FIG. 6A, the GMV (GMV_t(0)) on the upper half of the immediately-preceding non-reference picture (N), as is, is applied to the GMV (GMV_t) on an upper half of the current picture (GMV_T on the current picture is derived using the motion information on the upper half of the immediately-preceding non-reference picture (N)). Furthermore, as illustrated in FIG. 6A, the GMV (GMV_b(0)) on a lower half of the immediately-preceding non-reference picture (N), as is, is applied to the GMV (GMV_b) on a lower half of the current picture (GMV_b on the current picture is derived using the motion information on the lower half of the immediately-preceding non-reference picture (N)).

Therefore, as illustrated in FIG. 6B, for example, GMV_t (0) on the immediately-preceding non-reference picture (N), as is, is applied to the starting point for the speculative execution point (speculative_gmv_t) for the upper half of the current picture (is derived using the motion information on the upper half of the immediately-preceding non-reference picture (N)). Furthermore, as illustrated in FIG. 6B, for example, GMV_b(0) on the immediately-preceding non-reference picture (N) that, as is, is applied to the starting point for the speculative execution point (speculative_gmv_b) for the lower half of the current picture (is derived using the motion information on the lower half of the immediately-preceding non-reference picture (N)).

Then, as illustrated in FIG. 6B, an average of both GMV_T(0) and GMV_b(0) on the immediately-preceding non-reference picture (N) is applied to the offset of the search area (search_area_offset) (is derived using the moving information on the entire immediately-preceding non-reference picture (N) (both moving information on the upper half and motion information on the lower half)).

In contrast, when the current picture (CurP) is the reference picture (R), since the processing of the immediately-preceding non-reference picture (N) is in progress, the motion information on the entire immediately-preceding non-reference picture (N) is difficult to use. However, as illustrated in FIG. 5, the processing of the upper half is finished at a point in time for starting the processing of the current picture. Therefore, for the GMV (GMV_t) on the upper half of the current picture, as illustrated in FIG. 7A, the GMV (GMV_t(0)) on the upper half of the immediately-preceding non-reference picture (N), as is, can be applied (GMV_t on the current picture is derived using the motion information on the upper half of the immediately-preceding non-reference picture (N)).

Furthermore, as illustrated in FIG. 5, the processing of the immediately-preceding non-reference picture (N) is finished at a point in time for starting the processing of the lower half of the current picture. Therefore, the GMV (GMV_b (0)) on the lower half of the immediately-preceding non-reference picture (N), as is, can be applied also to the GMV (GMV_b) on the lower half of the current picture (GMV_b on the current picture is derived using the motion information on the lower half of the immediately-preceding non-reference picture (N)).

Figures 7A, 7B:
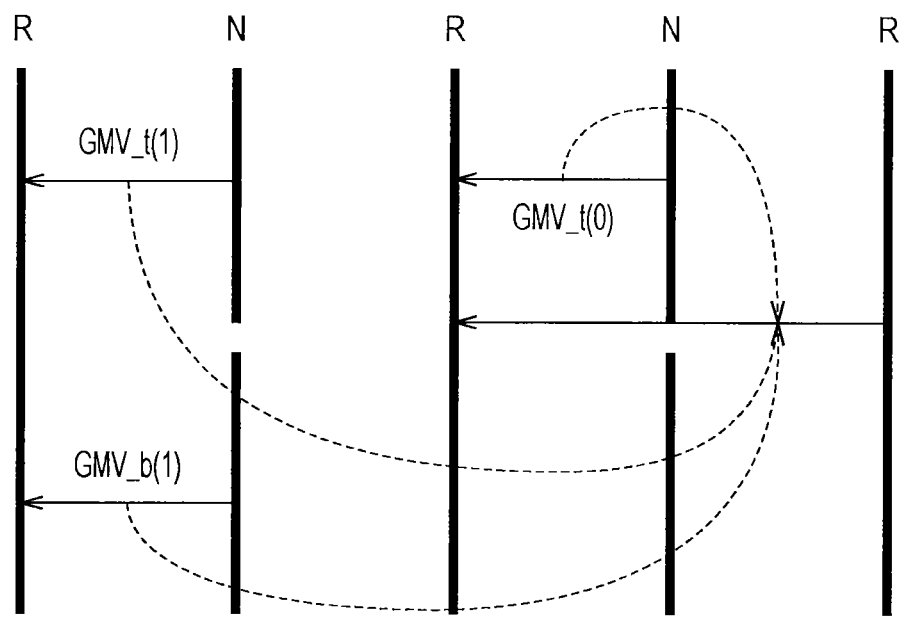
FIGS. 7A and 7B are diagrams illustrating another example of the state of the GMV derivation from the Ref picture.

Therefore, as illustrated in FIG. 7B, for example, GMV_t (0) on the immediately-preceding non-reference picture (N), as is, can be applied to the starting point for the speculative execution point (speculative_gmv_t) for the upper half of the current picture (is derived using the motion information on the upper half of the immediately-preceding non-reference picture (N)). Furthermore, as illustrated in FIG. 7B, for example, GMV_b(0) on the immediately-preceding non-reference picture (N), as is, can be applied also to the starting point for the speculative execution point (speculative_gmv_b) for the lower half of the current picture (is derived using the motion information on the lower half of the immediately-preceding non-reference picture (N)).

In contrast, because the offset of the search area (search_area_offset) has to be derived at a point in time for starting the current picture, the motion information on the lower half of the immediately-preceding non-reference picture (N) is difficult to use. Accordingly, in order to suppress an increase in the image quality deterioration, the offset of the search area is derived using the GMV (GMV_t(0)) on the upper half of the immediately-preceding non-reference picture (N) (that is, the motion information on a portion whose processing is finished, of the picture whose processing is in progress).

More specifically, in order to further improve the GMV precision, as illustrated in FIG. 7A, the offset of the search area is derived using also the GMV (GMV (1)) on the entire non-reference picture (N) that precedes the current picture by one picture (for example, the GMV (GMV)_t(1) on the upper half of the non-reference picture (N) that precedes the current picture by one picture) and the GMV (GMV_b(1) on the lower half of the non-reference picture (N) that precedes the current picture by one picture. For example, an average of GMV_t(1) and GMV_b(1) is obtained as the GMV of the entire non-reference picture (N) that precedes the current picture by one picture, and a difference between GMV_t(1) and GMV_t(0), that is, a difference in the motion in the upper half between the non-reference picture (N) that precedes the current picture by one picture and the immediately-preceding non-reference picture (N) is reflected in the entire picture.

More specifically, as illustrated in FIG. 7B, the difference between GMV_t(1) and GMV t_(0) is added to the average of GMV_t(1) and GMV_b(1). By deriving the offset of the search area (search_area_offset) in this manner, the reduction in the GMV precision can be further suppressed, and the reduction in image quality due to the coding can be further suppressed.

2. First Embodiment

Image Coding Device

Figure 8:
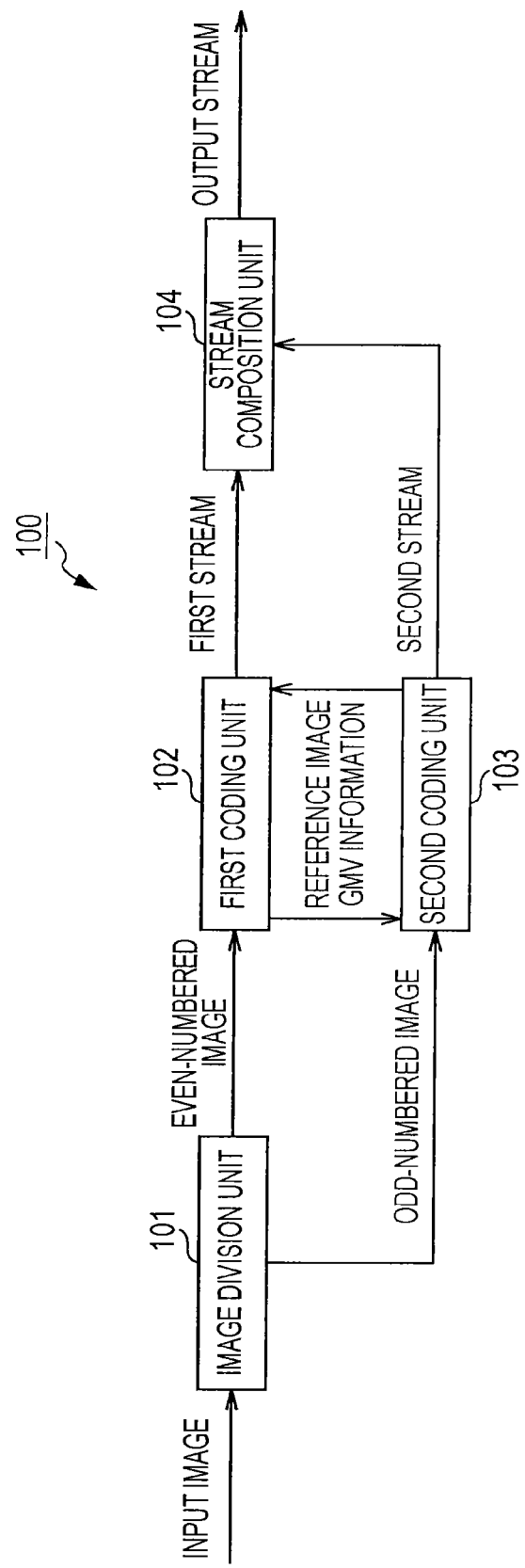
FIG. 8 is a block diagram illustrating a main configuration example of an image coding device according to the present disclosure.

Next, an image processing device to which the present technology described above is applied is described. FIG. 8 is a block diagram illustrating one example of a configuration of an image coding device 100 according to a first embodiment of the present disclosure. The image coding device 100 illustrated in FIG. 8 divides an input image being a moving image into two arrangements for parallelization for every picture and codes the images in the two arrangements.

As illustrated in FIG. 8, the image coding device 100 includes an image division unit 101, a first coding unit 102, a second coding unit 103, and a stream composition unit 104.

The image division unit 101 alternately divides the input image into the two arrangements. That is, the image division unit 101 supplies an even-numbered picture of the input image (an even-numbered image) to the first coding unit 102 and supplies an odd-numbered picture (an odd-numbered image) to the second coding unit 103. Moreover, the input image hereinafter refers to a moving image (or a picture of the image) in one arrangement that is present before the division by the image division unit 101, which is input into the image coding device 100.

The first coding unit 102 codes a group of supplied even-numbered images as a moving image in one arrangement. For example, the first coding unit 102 generates a prediction image by performing an intra prediction that is the same as an advanced video coding (AVC) or high efficiency video coding (HEVC), or an inter-prediction, and generates a stream (first stream) by performing orthogonal transformation, quantification, or the like on the prediction image and a difference image of the even-numbered image that is input and performing reversible coding on the result. The first coding unit 102 supplies the generated first stream (code data on the group of even-numbered images) to the stream composition unit 104.

The second coding unit 103 performs the same coding on a group of supplied odd-numbered images as the first coding unit 102 and generates a second stream. The second coding unit 103 supplies the generated second stream (code data on the group of odd-numbered images) to the stream composition unit 104.

The stream composition unit 104 composites the supplied first stream and second stream and generates an output stream in one arrangement. That is, the stream composition unit 104 rearranges into one arrangement the code data on each even-numbered image included in the first stream and the code data on each odd-numbered image included in the second stream in an order in which the pictures are arranged in the input image. At that time, the stream composition unit 104 generates header information on an output stream by properly combining header information on the first stream and header information on the second stream and performing proper parameter conversion. Basically, by compositing the first stream and the second stream, the stream composition unit 104 generates the stream as when the input image is coded without the parallelization. The stream composition unit 104 outputs the generated output stream to outside of the image coding device 100.

Moreover, the first coding unit 102 and the second coding unit 103 can perform the processing mutually in parallel. Basically, while the first coding unit 102 codes the picture that is the input image, the second coding unit 103 can perform the coding on the next picture that is the input image. When done in this manner, each of the first coding unit 102 and the second coding unit 103 can use the vertical synchronization period for two pictures in coding one picture. In other words, the first coding unit 102 and the second coding unit 103 perform the coding on one picture within the vertical synchronization period for two pictures and thus can output the output stream without overflow in real time (promptly), that is, at a speed corresponding to a frame rate of the input image.

Basically, because the first coding unit 102 and the second coding unit 103 can perform the processing in parallel and thus can secure a longer time for the coding processing, the image coding device 100 can perform the coding in real time even though the input image may be, for example, a picture that has a great amount of data (a large number of pixels, a large number of bits, or the like) like a 4K image.

Furthermore, the first coding unit 102 and the second coding unit 103 can mutually exchange information on the coding properly, such as information on the reference image or the GMV. That is, one of the first coding unit 102 and the second coding unit 103 can use the information on the coding performed by the other in the coding that is performed by one of the first coding unit 102 and the second coding unit 103. For example, one of the first coding unit 102 and the second coding unit 103 can derive the GMV using the motion information on the picture that is previously coded in the other coding unit and can use such a GMV in coding the current picture.

First Coding Unit

Figure 9:
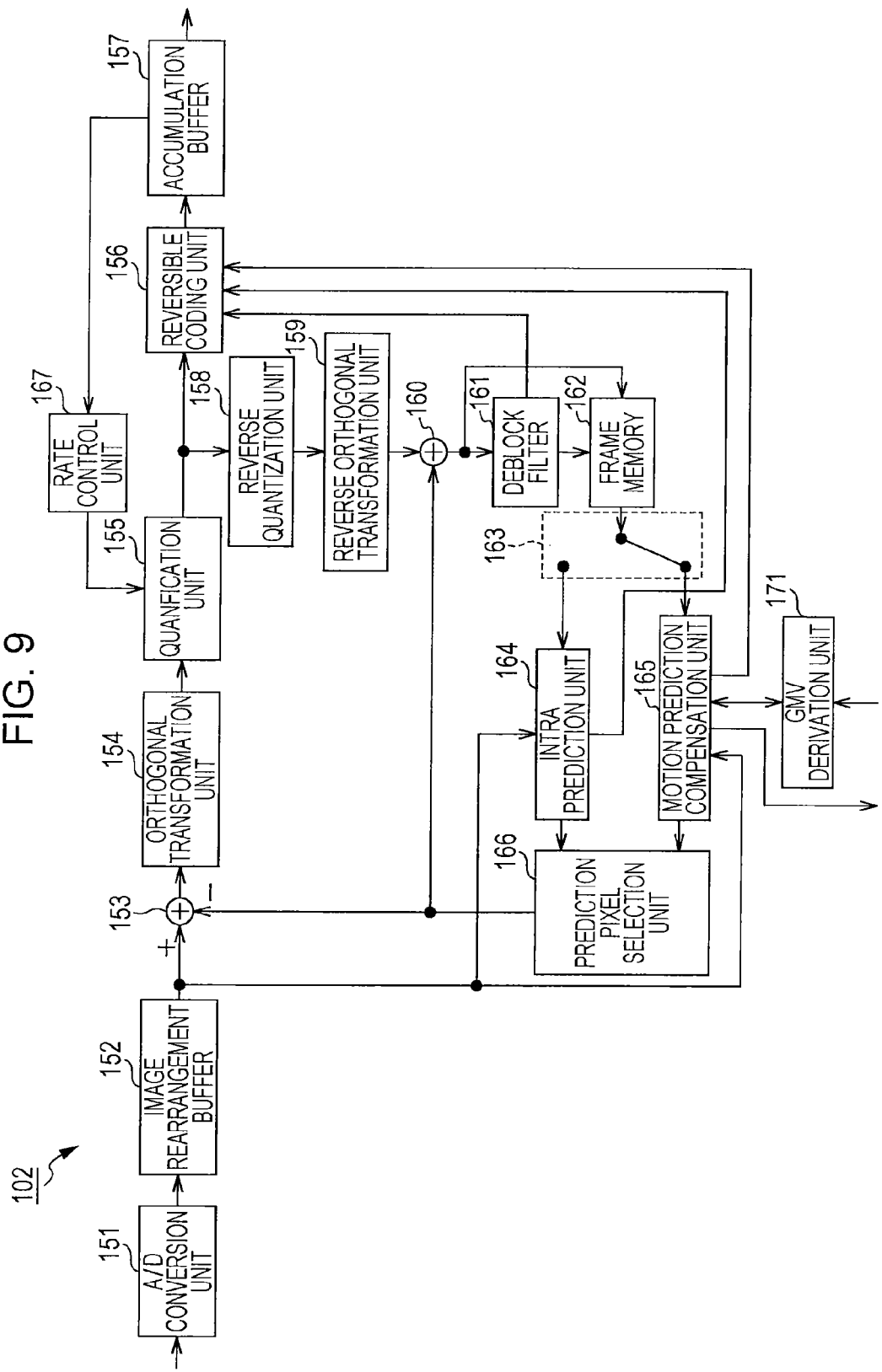
FIG. 9 is a block diagram illustrating a main configuration example of a first coding unit.

FIG. 9 is a block diagram illustrating a main configuration example of the first coding unit 102 in FIG. 8.

The first coding unit 102 illustrated in FIG. 9 codes the image data by performing prediction processing such as AVC or HEVC.

As illustrated in FIG. 9, the first coding unit 102 includes an A/D conversion unit 151, an image rearrangement buffer 152, an arithmetic operation unit 153, an orthogonal transformation unit 154, a quantification unit 155, a reversible coding unit 156, and an accumulation buffer 157. Furthermore, the first coding unit 102 includes a reverse quantification unit 158, a reverse orthogonal transformation unit 159, an arithmetic operation unit 160, a deblock filter 161, a frame memory 162, a selection unit 163, an intra prediction unit 164, a motion prediction and compensation unit 165, a prediction image selection unit 166, and a rate control unit 167.

The first coding unit 102 additionally has a GMV derivation unit 171.

The A/D conversion unit 151 performs A/D conversion on the image data that is input, and supplies and stores post-conversion image data (digital data) to and in the image rearrangement buffer 152. Moreover, if the image that is input is a digital image, the A/D conversion unit 151 is unnecessary. According to a group of pictures (GOP), the image rearrangement buffer 152 rearranges the image in frames in the order of stored display, in a frame order for the coding, and supplies the image in a rearranged frame order to the arithmetic operation unit 153. Furthermore, the image rearrangement buffer 152 supplies the image in the rearranged frame order to the intra prediction unit 164 and also the motion prediction and compensation unit 165.

The arithmetic operation unit 153 subtracts the prediction image that is supplied through the prediction image selection unit 166 from the intra prediction unit 164 or the motion prediction and compensation unit 165, from the image that is read from the image rearrangement buffer 152 and outputs the resulting difference information to the orthogonal transformation unit 154.

For example, if inter-coding is performed on the image, the arithmetic operation unit 153 subtracts the prediction image that is supplied from the motion prediction and compensation unit 165, from the image that is read from the image rearrangement buffer 152.

The orthogonal transformation unit 154 performs an orthogonal transformation, such as discrete cosine transformation or Karhunen-Loeve transformation, on the difference information that is supplied from the arithmetic operation unit 153. Moreover, such an orthogonal transformation method is arbitrary. The orthogonal transformation unit 154 supplies such a transformation coefficient to the quantification unit 155.

The quantification unit 155 quantifies the transformation coefficient that is supplied from the orthogonal transformation unit 154. The quantification unit 155 sets a quantification parameter based on the information relating to a target value of an amount of codes, which is supplied from the rate control unit 167 and performs quantification on the quantification parameter. Moreover, such a quantification method is arbitrary. The quantification unit 155 supplies the quantified transformation coefficient to the reversible coding unit 156.

The reversible coding unit 156 codes the transformation coefficient that is quantified in the quantification unit 155, using an arbitrary coding method. Because coefficient data is quantified under the control of the rate control unit 167, such an amount of codes is a target value that is set by the rate control unit 167 (or is near the target value).

Furthermore, the reversible coding unit 156 obtains from the intra prediction unit 164 information indicating an intra prediction mode or the like, and obtains from the motion prediction and compensation unit 165 information indicating an inter-prediction mode, motion vector information, or the like. Additionally, the reversible coding unit 156 can obtain a filter coefficient or the like that is used in the deblock filter 161.

The reversible coding unit 156 codes such various pieces of information using the arbitrary coding method and sets (multiplexes) the result of the coding to be one part of the header information on the code data. The reversible coding unit 156 supplies and accumulates the code data that is coded and obtained, to and in the accumulation buffer 157.

For example, variable-length coding, arithmetic coding, or the like may be enumerated as the coding method that is used by the reversible coding unit 156. For example, context-adaptive variable length coding (CAVLC) that is determined with an H.264/AVD method or the like may be enumerated as the variable-length coding. For example, context-adaptive binary arithmetic coding (CABAC) or the like may be enumerated as the arithmetic coding.

The accumulation buffer 157 temporarily retains the code data that is supplied from the reversible coding unit 156. The accumulation buffer 157 outputs the code data being retained, as a bit stream (the first stream), at a predetermined timing.

Furthermore, the transformation coefficient that is quantified in the quantification unit 155 is supplied also to the reverse quantification unit 158. The reverse quantification unit 158 reversely quantizes the quantified transformation coefficient using a method corresponding to the quantification by the quantification unit 155. Such a reverse quantification method may be whatever corresponds to the quantizing processing by the quantification unit 155. The reverse quantification unit 158 supplies the obtained transformation coefficient to the reverse orthogonal transformation unit 159.

The reverse orthogonal transformation unit 159 performs reverse orthogonal transformation on the transformation coefficient that is supplied from the reverse quantification unit 158, using a method corresponding to orthogonal transformation processing by the orthogonal transformation unit 154. Such a reverse orthogonal transformation method may be whatever corresponds to the orthogonal transformation processing by the orthogonal transformation unit 154. The output that goes through the reverse orthogonal transformation (the restored difference information) is supplied to the arithmetic operation unit 160.

The arithmetic operation unit 160 adds the prediction image that is supplied through the prediction image selection unit 166 from the intra prediction unit 164 or the motion prediction and compensation unit 165, to a result of the reverse orthogonal transformation that is supplied from the reverse orthogonal transformation unit 159, that is, to the restored difference information, and obtains a locally-decoded image (decode image). Such a decode image is supplied to the deblock filter 161 or the frame memory 162.

The deblock filter 161 removes a block distortion in a decode image by performing deblock filter processing on the decode image that is supplied from the arithmetic operation unit 160. If necessary, the deblock filter 161 supplies information, such as the filter coefficient, that is used in filter processing, to the reversible coding unit 156 and can code such information.

The deblock filter 161 supplies a result of the filter processing (the decode image after the filter processing) to the frame memory 162. Moreover, as described above, the decode image that is output from the arithmetic operation unit 160 can be supplied to the frame memory 162 without passing through the deblock filter 161. Basically, the filter processing by the deblock filter 161 can be omitted.

The frame memory 162 stores the supplied decode image, and at a predetermined timing, supplies the stored decode image, as the reference image, to the selection unit 163.

The selection unit 163 selects a supply destination of the reference image that is supplied from the frame memory 162. For example, in a case of the inter-prediction, the selection unit 163 supplies the reference image that is supplied from the frame memory 162, to the motion prediction and compensation unit 165.

The intra prediction unit 164 performs the intra prediction (inter-image prediction) in which the prediction image is generated using a pixel value within a processing-target picture that is the reference image which is supplied through the selection unit 163 from the frame memory 162. The intra prediction unit 164 performs such an intra prediction in multiple modes (intra prediction mode) that are prepared in advance.

The intra prediction unit 164 generates the prediction image in all the intra prediction modes that are candidates, evaluates a cost function value of each prediction image using the input image that is supplied from the image rearrangement buffer 152, and selected an optimal mode. When the optimal intra prediction mode is selected, the intra prediction unit 164 supplies the prediction image being generated in such an optimal mode to the prediction image selection unit 166.

Furthermore, as described above, the intra prediction unit 164 supplies intra prediction mode information indicating the employed intra prediction mode and the like to the proper reversible coding unit 156 and codes such information.

The motion prediction and compensation unit 165 performs motion prediction (inter-prediction) using the input image that is supplied from the image rearrangement buffer 152 and the reference image that is supplied through the selection unit 163 from the frame memory 162, performs motion compensation processing according to the detected motion vector, and generates the prediction image (inter-prediction image information). The motion prediction and compensation unit 165 performs such an inter-prediction in the multiple modes (inter-prediction mode) that are prepared in advance.

The motion prediction and compensation unit 165 generates the prediction image in all the inter-prediction modes that are candidates, evaluates the cost function value of each prediction image, and selects the optimal mode. When the optimal inter-prediction mode is selected, the motion prediction and compensation unit 165 supplies the prediction image being generated in such an optimal mode to the prediction image selection unit 166.

Furthermore, when decoding the information indicating the employed inter-prediction mode or the code data, the motion prediction and compensation unit 165 supplies information necessary for performing the processing in such an inter-prediction mode and the like to the reversible coding unit 156 and codes such information and the like.

The prediction image selection unit 166 selects the supply destination of the prediction image that is supplied to the arithmetic operation unit 153 or the arithmetic operation unit 160. For example, in a case of the inter-coding, the prediction image selection unit 166 selects the motion prediction and compensation unit 165 as the supply destination of the prediction image, and supplies the prediction image that is supplied from the motion prediction and compensation unit 165, to the arithmetic operation unit 153 or the arithmetic operation unit 160.

The rate control unit 167 controls a rate of a quantification operation by the quantification unit 155 in such a manner that overflow or underflow does not occur, based on the amount of codes of the code data that is accumulated in the accumulation buffer 157.

The GMV derivation unit 171 derives the GMV using the motion information on the picture that is coded earlier than the current picture that is the processing target, derives the parameter that is used in the inter-prediction by the motion prediction and compensation unit 165 using such a GMV, and provides the derived parameter to the motion prediction and compensation unit 165.

For example, if the motion information on the even-numbered image that is previously coded is used, the GMV derivation unit 171 obtains the motion information on such a picture from the motion prediction and compensation unit 165 of the first coding unit 102, derives the GMV from such motion information, and derives the starting point for the speculative execution point of the inter-prediction or the offset of the search area using such a GMV. Furthermore, for example, if the motion information on the odd-numbered image that is previously coded is used, the GMV derivation unit 171 obtains the motion information on such a picture from (the motion prediction and compensation unit 165 of) the second coding unit 103, derives the GMV from such motion information, and derives the starting point for the speculative execution point of the inter-prediction or the offset of the search area using such a GMV.

At that time, as described above in association with the "third GMV derivation example," if the processing by the second coding unit 103 of an odd-numbered image from which the motion information is obtained is in progress, the GMV derivation unit 171 obtains the motion information on a portion (for example, an upper half of the picture) whose coding is finished, of such a picture, and derives the starting point for the speculative execution point of the inter-prediction or the offset of the search area using such a GMV.

Furthermore, as illustrated above in association with the "third GMV derivation example," in the GMV derivation unit 171, the moving information on the entire picture whose coding is finished and which is near the reference distance (that is, the picture that is the second or later nearest the current picture, among the pictures that are near the reference distance) may be also used if necessary. For example, the GMV derivation unit 171 may derive the offset of the search area using not only GMV_t(0) but also GMV_t(1) or GMV_b(1) by performing arithmetic operation illustrated referring to FIG. 7B.

The motion prediction and compensation unit 165 performs the inter-prediction using the parameter (the starting point for the speculative execution point or the offset of the search area) that is derived by the GMV derivation unit 171, and generates the prediction image. Moreover, the motion prediction and compensation unit 165 provides the motion information on the picture whose processing is finished, according to a request of (the GMV derivation unit 171 of) the second coding unit 103.

When done in this manner, the first coding unit 102 can suppress the reduction in the GMV precision and can suppress the reduction in image quality due to the coding of the image coding.

Second Coding Unit

Moreover, the second coding unit 103 is the same processing unit as the first coding unit 102 except that the odd-numbered image is coded instead of the even-numbered image, and thus performs the same coding as the first coding unit 102. Basically, the second coding unit 103 has the same configuration as the first coding unit 102 (refer to FIG. 9). Therefore, FIG. 9 can be referred to when the second coding unit 103 is described.

For example, even in a case of the second coding unit 103, the GMV derivation unit 171 derives the GMV using the motion information on the picture that is coded earlier than the current picture that is the processing target, derives the parameter that is used in the inter-prediction by the motion prediction and compensation unit 165 of the second coding unit 103 using such a GMV, and provides the derived parameter to the motion prediction and compensation unit 165 of the second coding unit 103.

For example, as in a case of the second coding unit 103, when the motion information on the even-numbered image that is previously coded is used, the GMV derivation unit 171 obtains the motion information on such a picture from the motion prediction and compensation unit 165 of the first coding unit 102, derives the GMV from such motion information, and derives the starting point for the speculative execution point of the inter-prediction or the offset of the search area using such a GMV. Furthermore, for example, if the motion information on the odd-numbered image that is coded in the past is used, the GMV derivation unit 171 obtains the motion information on such a picture from the motion prediction and compensation unit 165 of the second coding unit 103, derives the GMV from such motion information, and derives the starting point for the speculative execution point of the inter-prediction or the offset of the search area using such a GMV.

At that time, as described above in association with the "third GMV derivation example," if the processing by the first coding unit 102 of an even-numbered image from which the motion information is obtained is in progress, the GMV derivation unit 171 obtains the motion information on a portion (for example, an upper half of the picture) whose coding is finished, of such a picture, and derives the starting point for the speculative execution point of the inter-prediction or the offset of the search area using such a GMV.

Furthermore, as illustrated above in association with the "third GMV derivation example," in the GMV derivation unit 171, the moving information on the entire picture whose coding is finished and which is near the reference distance (that is, the picture that is the second or later nearest the current picture, among the pictures that are near the reference distance) may be also used if necessary. For example, the GMV derivation unit 171 may derive the offset of the search area using not only GMV_t(0) but also GMV_t(1) or GMV_b(1) by performing arithmetic operation illustrated referring to FIG. 7B.

The motion prediction and compensation unit 165 of the second coding unit 103 performs the inter-prediction using the parameter (the starting point for the speculative execution point or the offset of the search area) that is derived by the GMV derivation unit 171 of the second coding unit 103, and generates the prediction image. Moreover, the motion prediction and compensation unit 165 of the second coding unit 103 provides the motion information on the picture whose processing is finished, according to a request of the GMV derivation unit 171 of the first coding unit 102.

When done in this manner, the second coding unit 103 can suppress the reduction in the GMV precision and can suppress the reduction in image quality due to the coding of the image coding. Because the first coding unit 102 and the second coding unit 103 can suppress the reduction in the GMV precision in this manner, the image coding device 100 can suppress the reduction in image quality due to the coding of the image.

Flow of the Processing

Next, a flow of the processing that is performed by the image coding device 100 is described.

Flow of Parallel Coding Processing

Figure 10:
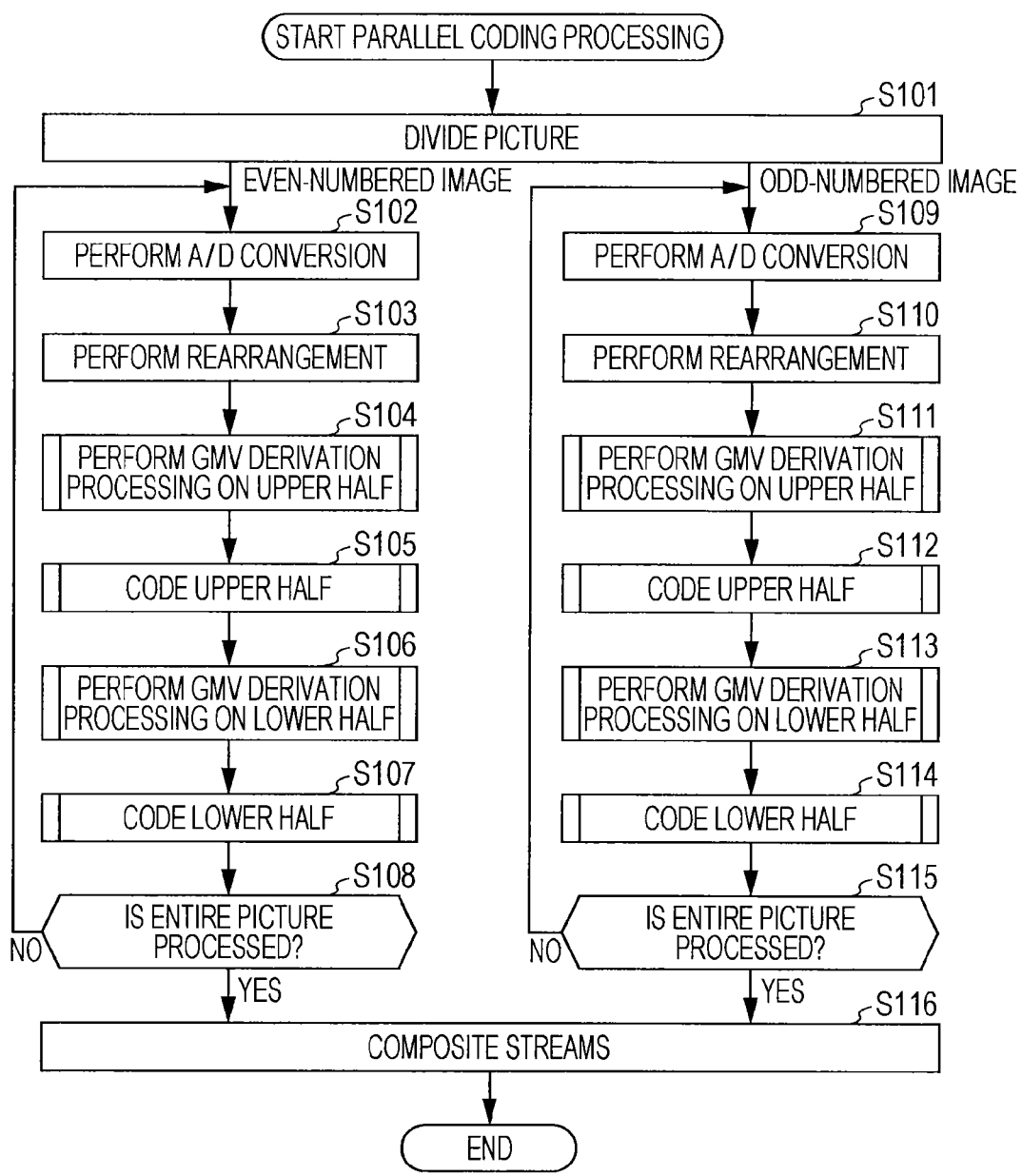
FIG. 10 is a flow chart illustrating an example of a flow of parallel coding processing.

An example of a flow of parallel coding processing that is performed by the image coding device 100 is described referring to a flow chart in FIG. 10.

In Step S101, the image division unit 101 of the image coding device 100 sequentially divides each picture of the input image into an even-numbered image and an odd-numbered image. Processing operations in Steps S102 to S108 are performed on the even-numbered image. Processing operations in Steps S109 to S115 are performed on the odd-numbered image. The processing operations in Steps 102 to 108, which are performed on the even-numbered image and the processing operations in Steps 109 to 115, which are performed on the odd-numbered image, can be performed mutually in parallel.

In Step S102, the A/D conversion unit 151 of the first coding unit 102 performs the A/D conversion on the even-numbered image that is input. In Step S103, the image rearrangement buffer 152 of the first coding unit 102 stores the image on which the A/D conversion is performed, and if necessary, rearranges the pictures in such a manner that the order in which the pictures are displayed is changed to the order in which the pictures are coded.

In Step S104, the GMV derivation unit 171 of the first coding unit 102 performs GMV derivation processing that derives the GMV, on an upper half portion of the current picture. In Step S105, the first coding unit 102 performs the coding on the upper half portion of the current picture.

In Step S106, the GMV derivation unit 171 of the first coding unit 102 performs GMV derivation processing that derives the GMV, on a lower half portion of the current picture. In Step S107, the first coding unit 102 performs the coding on the lower half portion of the current picture.

In Step S108, the first coding unit 102 determines whether or not all the pictures (that is, all the even-numbered images) that belong to a group of even-numbered images have been processed. If it is determined that a picture that has not been processed is present, the processing returns to Step 102. The first coding unit 102 performs the processing operations in Steps S102 to S108 on each picture. Then, in Step S108, if it is determined that all the pictures have been processed, the processing proceeds to Step S116.

Furthermore, in Step S109, the A/D conversion unit 151 of the second coding unit 103 performs the A/D conversion on the odd-numbered image that is input. In Step S110, the image rearrangement buffer 152 of the second coding unit 103 stores the image on which the A/D conversion is performed, and if necessary, performs rearranging on the pictures in such a manner that the order in which the pictures are displayed is changed to the order in which the pictures are coded.

In Step S111, the GMV derivation unit 171 of the second coding unit 103 performs the GMV derivation processing that derives the GMV, on the upper half portion of the current picture. In Step S112, the second coding unit 103 performs the coding on the upper half portion of the current picture.

In Step S113, the GMV derivation unit 171 of the second coding unit 103 performs the GMV derivation processing that derives the GMV, on the lower half portion of the current picture. In Step S114, the second coding unit 103 performs the coding on the lower half portion of the current picture.

In Step S115, the second coding unit 103 determines whether or not all the pictures (that is, all the odd-numbered images) that belong to a group of odd-numbered images have been processed. If it is determined that a picture that has not been processed is present, the processing returns to Step 109. The second coding unit 103 performs the processing operations in Steps S109 to S115 on each picture. Then, in Steps S115, if it is determined that all the pictures have been processed, the processing proceeds to Step S116.

In Step S116, the stream composition unit 104 composites a first stream that is generated by the processing operations in Steps 102 to 108, and a second stream that is generated by the processing operations by the processing operations in Steps 109 to 115, and generates an output stream. Moreover, the stream composition unit 104 may sequentially composite the streams of each picture that are supplied. Basically, the processing in Step S116 may be performed in parallel with the processing operations in Steps S102 to S108, which are repeatedly performed, and the processing operations in Steps S109 and S115.

When the first stream and the second stream are all composited and the processing in Step S116 is finished, the parallel coding processing is finished.

Flow of the GMV Derivation Processing of the Upper Half

Figure 11:
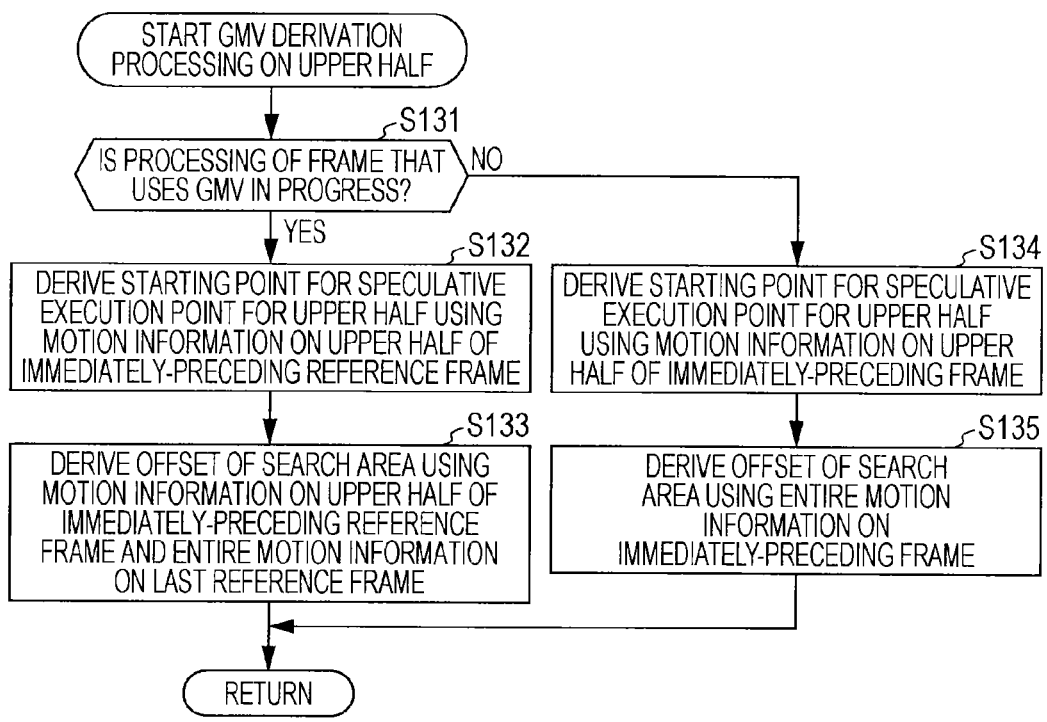
FIG. 11 is a flow chart illustrating an example of a flow of GMV derivation processing of an upper half.

Next, an example of a flow of the GMV derivation processing of the upper half that is performed in Step S104 in FIG. 10 is described referring to a flow chart in FIG. 11. As illustrated in FIG. 10, the GMV derivation processing of the upper half is performed when the coding starts to be performed on the current picture.

When the GMV derivation processing of the upper half starts, in Step S131, the GMV derivation unit 171 of the first coding unit 102 specifies a frame (picture) that uses GMV (motion information) and determines whether or not the processing of such a picture is in progress (the coding by the second coding unit 103 is in progress). The GMV derivation unit 171 specifies the picture that is nearest the current picture, among the pictures that are near the reference distance, as the picture that uses the GMV (motion information). Then, the GMV derivation unit 171 determines whether or not such a picture, for example, is the immediately-preceding picture and whether or not the coding of such a picture by the second coding unit 103 is in progress. If it is determined that the processing is in progress, the processing proceeds to Step S132. Moreover, the determination of whether or not the processing of the picture is in progress is not limited to being based on the information indicating whether or not the processing is actually in progress, and may be made by estimating that the processing is in progress, using the information on the picture (the reference picture or the non-reference picture) before the processing-target picture.

In Step S132, using the motion information on the upper half portion of such a picture whose process is in progress (or GMV_t(0) on the upper half portion of such a picture), the GMV derivation unit 171 performs, for example, the arithmetic operation illustrated in FIG. 7B, and derives the starting point for the speculative execution point (speculative_gmv_t) of the inter-prediction for the upper half portion of the current picture.

In Step S133, the GMV derivation unit 171, for example performs that arithmetic operation illustrated in FIGS. 7A and 7B, and derives the search area offset (search_area_offset) of the inter-prediction for the entire current picture. This is done by using the motion information (or GMV(1) on the entire picture) on the entire picture before the picture whose processing is in progress, among the pictures that are near the reference distance, or using the motion information on the upper half portion (or GMV_t(1) on the upper half portion) and the motion information on the lower half portion) (or GMV_b(1) on the lower half), in addition to the motion information on the upper half portion of such a picture whose process is in progress (or GMV_t(0) on the upper half portion of such a picture).

When the processing in Step S133 is finished, the GMV derivation processing of the upper half is finished and the processing returns to the flow chart in FIG. 10. Furthermore, in Step S131, if it is determined that the processing of the picture that uses the GMV (motion information) is not in progress, the processing proceeds to Step S134.

In Step S134, using the motion information on the upper half portion of such a picture whose process is finished (or GMV_t(0) on the upper half portion of such a picture), the GMV derivation unit 171 performs, for example, the arithmetic operation illustrated in FIG. 6B, and derives the starting point for the speculative execution point (speculative_gmv_t) of the inter-prediction for the upper half portion of the current picture.

In Step S135, the GMV derivation unit 171 performs, for example, the arithmetic operation illustrated in FIG. 6B, and derives the search area offset (search_area_offset) of the inter-prediction for the entire current picture. This is done using the motion information (or GMV(0) on the entire picture) on the entire picture whose processing is finished, or using the motion information on the upper half portion (or GMV_t(0) on the upper half portion) and the motion information on the lower half portion (or GMV_b(0) on the lower half portion).

When the processing in Step S135 is finished, the GMV derivation processing of the upper half is finished, and the processing returns to the flow chart in FIG. 10.

Moreover, in Step S111 in FIG. 10, the GMV derivation unit 171 of the second coding unit 103 performs the GMV derivation processing of the upper half in the same manner as in the flow chart in FIG. 11.

Flow of the Coding Processing of the Upper Half Portion

Figure 12:
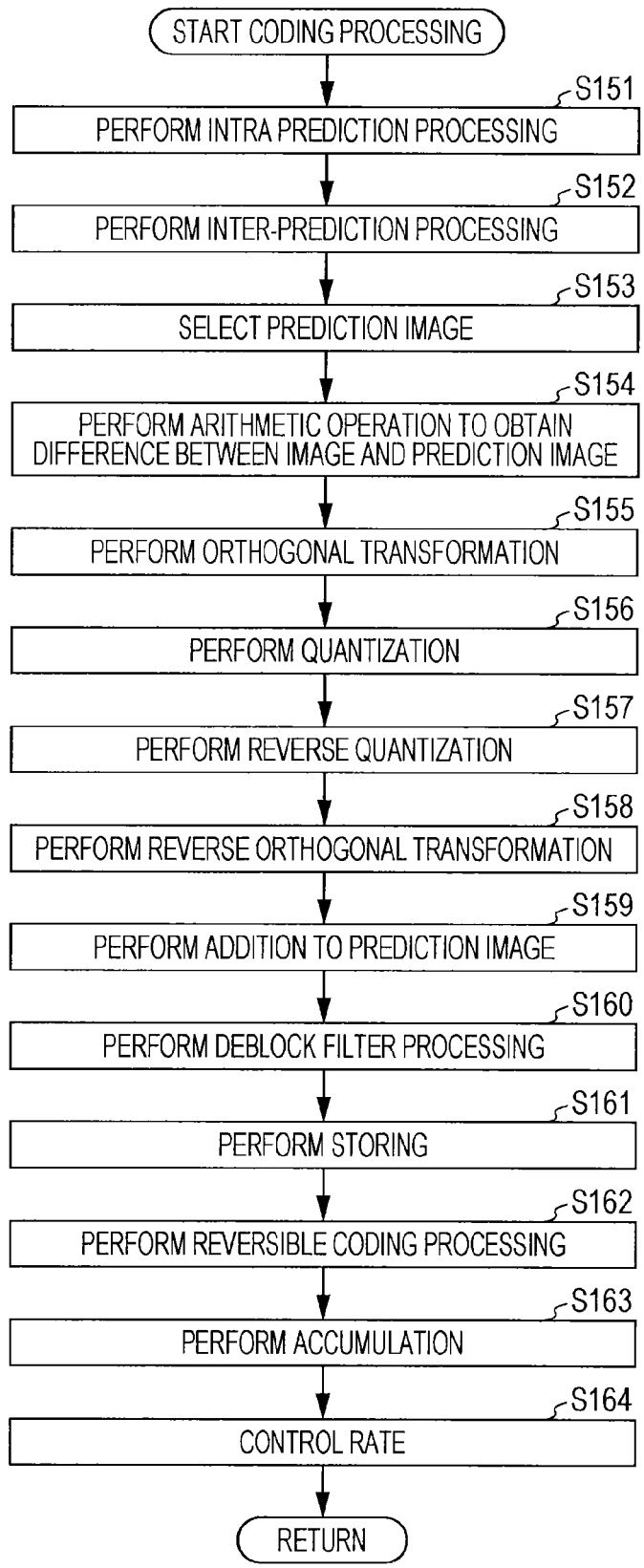
FIG. 12 is a flow chart illustrating an example of a flow of coding processing.

Next, an example of a flow of the coding processing of the current picture that is performed in Step S105 in FIG. 10 is described referring to a flow chart in FIG. 12.

When the coding processing starts, in Step S151, the intra prediction unit 164 performs intra prediction processing in the intra prediction mode. In Step S152, the motion prediction and compensation unit 165 performs inter-motion-prediction processing that performs the motion prediction or motion compensation in the inter-prediction mode. At the time of the inter-prediction, the motion prediction and compensation unit 165 uses the GMV (the starting point for the speculative execution point (speculative_gmv_t) of the inter-prediction) or the search area offset (search_area_offset) of the inter-prediction, derived by the GMV derivation unit 171.

In Step S153, the prediction image selection unit 166 determines an optimal prediction mode, based on each cost function value that is output from the intra prediction unit 164 and the motion prediction and compensation unit 165. Basically, the prediction image selection unit 166 selects either of the prediction image that is generated by the intra prediction unit 164 or the prediction image that is generated by the motion prediction and compensation unit 165.

In Step S154, the arithmetic operation unit 153 performs the arithmetic operation to obtain a difference between the image that is rearranged and the prediction image that is selected by the processing in Step S153. Difference data is reduced in terms of an amount of data, compared to original image data. Therefore, an amount of data can be compressed, compared to a case where the image, as is, is coded.

In Step S155, the orthogonal transformation unit 154 performs the orthogonal transformation on the difference information that is generated by the processing in Step S154. More specifically, the orthogonal transformation, such as the discrete cosine transform, or the Karhunen-Loeve transformation is performed and the transformation coefficient is output. In Step S156, the quantification unit 155 performs quantification on an orthogonal transformation coefficient that is obtained by the processing in Step S155.

The difference information that is quantified by the processing in Step S156 is locally decoded as follows. That is, in Step S157, the reverse quantification unit 158 reversely quantifies the orthogonal transformation coefficient that is quantified by the processing in Step S156 using a method that corresponds to the quantization in Step S156. In Step S158, the reverse orthogonal transformation unit 159 performs the reverse orthogonal transformation on the orthogonal transformation coefficient that is obtained by the processing in Step S157 using a method that corresponds to the processing in Step S155.

In Step S159, the arithmetic operation unit 160 adds the prediction image to the difference information that is locally decoded and generates the image (the image that corresponds to the input to the arithmetic operation unit 153) that is locally decoded. In Step S160, the deblock filter 161 performs the deblock filter processing on the image that is generated by the processing in Step S159. By doing this, the block distortion is removed.

In Step S161, the frame memory 162 stores the image on which the block distortion and the like are performed by the processing in Step S160. Moreover, the image on which the filter processing is not performed by the deblock filter 161 is supplied from the arithmetic operation unit 160 to the frame memory 162 and is stored in the frame memory 162. The image that is stored in the frame memory 162 is used in the processing in Step S151 or the processing in Step S152.

In Step S162, the reversible coding unit 156 codes the transformation coefficient that is quantified by the processing in Step S156 and generates the code data. That is, the reversible coding, such as the variable-length coding or the arithmetic coding, is performed on the difference image (a second difference image in a case of the inter-prediction).

Moreover, the reversible coding unit 156 decodes the information relating to the prediction mode of the prediction image that is selected by the processing in Step S153, and adds to the code data that is obtained by coding the difference image. For example, if the intra prediction mode is selected, the reversible coding unit 156 codes the intra prediction mode information. Furthermore, for example, if the inter-prediction mode is selected, the reversible coding unit 156 codes inter-prediction mode information. Such information, for example, is added (multiplexed), as the header information and the like, to the code data.

In Step S163, the accumulation buffer 157 accumulates the code data that is generated by the processing in Step S162. The code data that is accumulated in the accumulation buffer 157 is properly read and is transmitted to a device at the decoding side through an arbitrary transmission path (including not only a communication path but also a storage medium and the like).

In Step S164, the rate control unit 167 controls the rate of the quantization operation by the quantification unit 155 in such a manner that the overflow or the underflow does not occur, based on compression data that is accumulated, by the processing in Step S163, in the accumulation buffer 157.

When the processing is finished in Step S164, the coding processing is finished, and the processing returns to the flow chart in FIG. 10. The first coding unit 102 performs the coding processing on the upper half portion of the current picture by performing the coding processing described above.

Moreover, in Step S112 in FIG. 10, the second coding unit 103 performs the coding processing in the same manner as in the step in FIG. 12.

Flow of the GMV Derivation Processing of the Lower Half

Figure 13:
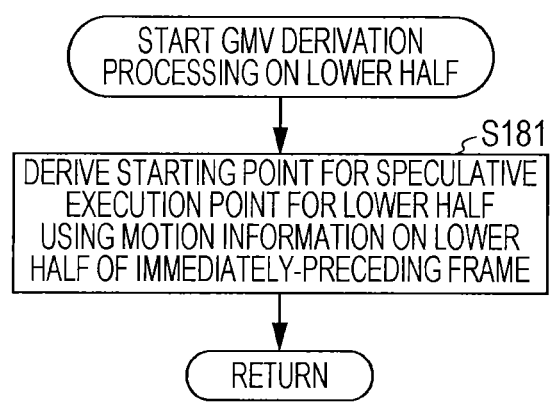
FIG. 13 is a flow chart illustrating an example of a flow of the GMV derivation processing of a lower half.

Next, an example of a flow of the GMV derivation processing of the lower half that is performed in Step S106 in FIG. 10 is described referring to a flow chart in FIG. 13. As illustrated in FIG. 10, the GMV derivation processing of the lower half is performed after the coding being performed on the upper half portion of the current picture is finished.

When the GMV derivation processing of the lower half starts, in Step S181, the GMV derivation unit 171 of the first coding unit 102, for example, performs the arithmetic operation illustrated in FIG. 7B, and derives the starting point for the speculative execution point (speculative_gmv_t) of the inter-prediction for the lower half portion of the current picture. This is done by specifying the frame (picture) that uses the GMV (motion information) and using the motion information (or GMV_b(0) on the lower half portion of such a picture) on the lower half portion of such a picture.

When the processing in Step S181 is finished, the GMV derivation processing of the lower half is finished, and the processing returns to the step in FIG. 10.

Moreover, in Step in S113 in FIG. 10, the GMV derivation unit 171 of the second coding unit 103 performs the GMV derivation processing of the lower half in the same manner as in the step in FIG. 13.

Flow of the Coding Processing of the Lower Half Portion

Moreover, in Step S107 in FIG. 10, the first coding unit 102 performs the coding processing on the lower half portion of the current picture in the same manner as in the step in FIG. 12. Furthermore, in Step S114 in FIG. 10, the second coding unit 103 performs the coding processing on the lower half portion of the current picture in the same manner as in the step in FIG. 12.

By performing each processing as described above, the image coding device 100 can further suppress the reduction in image quality.

Others

The image division unit 101 is described above as assigning the input image into two arrangements, the even-numbered image and the odd-numbered image, and the first coding unit 102 and the second coding unit 103 as coding the images in the two arrangements, respectively. However, the image coding device 100 can have an arbitrary number of coding units that can perform the processing mutually in parallel. Basically, the image division unit 101 can divide the input image in a first arrangement into the number of arbitrary arrangements.

Furthermore, a configuration of the reference picture and the non-reference picture in the input image is arbitrary and is not limited to the example in FIGS. 6A and 6B or FIGS. 7A and 7B. Furthermore, the portion whose processing is finished, of the picture whose processing is in progress, the motion information on such a portion being used by the GMV derivation unit, is arbitrary and depends on the configuration of the reference picture, the non-reference picture or the number (the number of the arrangements into which the image division unit 101 divides the input image) of the coding units, or the like.

Additionally, a method of deriving the starting point for the speculative execution point of the inter-prediction or the search area offset is not limited to the example in FIGS. 6A and 6B or FIGS. 7A and 7B and is arbitrary.

3. Second Embodiment

Computer

A sequence of processing operations described above can be performed in hardware or can be performed in software. In this case, for example, the sequence of processing operations may be configured in a manner that is performed in a computer illustrated in FIG. 14.

Figure 14:
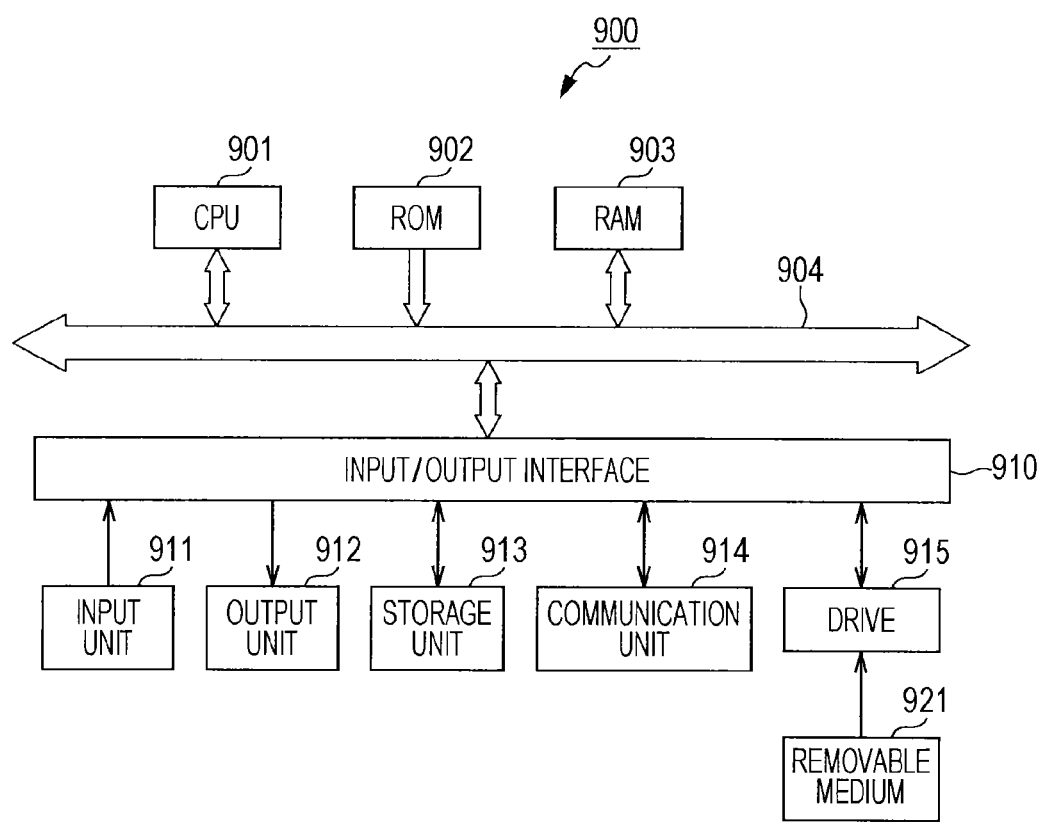
FIG. 14 is a block diagram illustrating a main configuration example of a computer.

In FIG. 14, a central processing unit (CPU) 901 of a computer 900 performs various processing operations according to a program that is stored in a read only memory (ROM) 902 or a program that is loaded from a storage unit 913 onto a random access memory (RAM) 903. Data and the like necessary for the CPU 901 to perform the various processing operations are also properly stored in the RAM 903.

The CPU 901, the ROM 902, and the RAM 903 are connected to one another through a bus 904. An input/output interface 910 is also connected to the bus 904.

An input unit 911, an output unit 912, a storage unit 913, and a communication unit 914 are connected to the input/output interface 910. The input unit 911 is configured from a keyboard, a mouse, a touch panel, and an input terminal. The output unit 912 is configured from a display, such as a cathode ray tube (CRT), a liquid crystal display (LCD), or an organic electroluminescence display (OLED), an arbitrary output device, such as speaker or an output terminal, and the like. The storage unit 913 is configured from an arbitrary storage medium such as a hard disk or a flash memory, a control unit that controls input and output of such a storage medium, and the like. The communication unit 914 is configured from an arbitrary wired or wireless communication device, such as a modem, a LAN interface, a universal serial bus (USB), and a Bluetooth (a registered trademark) device. The communication unit 914, for example, performs processing that communicates with another communication device through a network including the Internet.

A drive 915 is connected to the input/output interface 910 if necessary. A removable medium 921, such as a magnetic disk, an optical disc, or a magneto-optical disc, or a semiconductor memory, is properly mounted in the drive 915. The drive 915, for example, reads a computer program, data, or the like from the removable medium 921 mounted in the drive 915 under the control of the CPU 901. The data, or the computer program that is read is supplied, for example, to the RAM 903. Furthermore, the computer program that is read from the removable medium 921 is installed in the storage unit 913 if necessary.

If the sequence of processing operations described above is performed in software, the program that provides a body of such software is installed from the network or a recording medium.

As illustrated in FIG. 14, the recording medium, for example, may be configured not only from the removable medium 921, but also from the ROM 902, or the hard disk included in the storage unit 913. The removable medium 921 is configured from a magnetic disk (including a flexible disk), an optical disc (including a compact disc-read only memory (CD-ROM) and a digital versatile disc (DVD)), a magneto-optical disc (including a mini disc (MD)), a semiconductor memory, or the like, each of which is distributed for delivering the program to a user separately from a main body of an apparatus and on which the program is stored. The ROM 902, on which the program is stored, is delivered to the user in a state of being built into the main body of the apparatus in advance.

Moreover, the program executed by the computer may be a program by which the processing is performed in time series in the order described in the present specification, or may be a program by which the processing is performed in parallel at a necessary timing, such as when a call is performed.

Furthermore, in the present specification, the step of describing the program stored on the recording medium includes not only processing that is performed in time series according to the described order, but also processing that is performed in parallel or individually even though the processing is not necessarily performed in time series.

4. Third Embodiment

Imaging Apparatus

For example, the image coding device 100 described above according to the embodiments can be applied to various electronic apparatuses such as a transmitter or a receiver, a recording apparatus, or a reproducing apparatus. The transmitter or the receiver is used in delivery through satellite broadcasting, cable broadcasting such as cable TV, and the Internet, delivery to a terminal through cellular communication, and the like. The recording device records the image on a medium such as an optical disc, a magnetic disk, a flexible memory, or the like. The reproducing apparatus reproduces the image from the recording medium.

Figure 15:
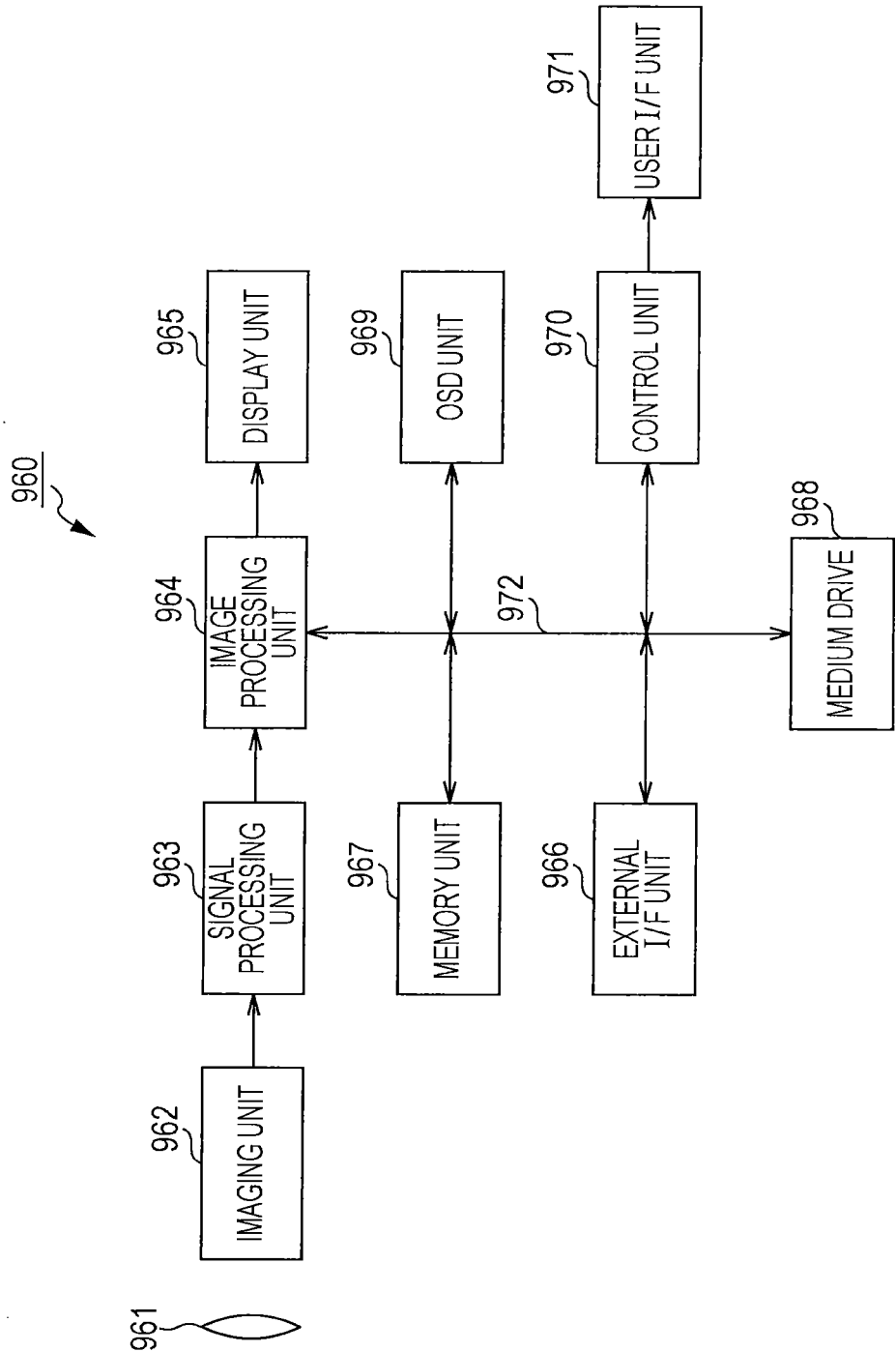
FIG. 15 is a block diagram illustrating a main configuration example of an imaging apparatus.

FIG. 15 illustrated one example of an outline configuration of an imaging apparatus to which the embodiment described above is applied. An imaging apparatus 960 images a photographic subject, generates an image of the photographic subject, codes image data on the image, and stores the coded image data in the recording medium.

The imaging apparatus 960 includes an optical block 961, an imaging unit 962, a signal processing unit 963, an image processing unit 964, a display unit 965, an external interface (I/F) unit 966, a memory 967, a medium drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 provides connections between the image processing unit 964, the external interface unit 966, the memory 967, the medium drive 968, the OSD 969, and the control unit 970.

The optical block 961 has a focal lens, a diaphragm mechanism, and the like. The optical block 961 causes an optical image of the photographic subject to be imaged onto an imaging surface of the imaging unit 962. The imaging unit 962 has an image sensor, such as a charge coupled device (CCD), or a complementary metal oxide semiconductor (CMOS), and by photoelectric conversion, converts the optical image imaged on the imaging surface into an image signal as an electrical signal. Then, the imaging unit 962 outputs the image signal to the signal processing unit 963.

The signal processing unit 963 performs various camera signal processing operations, such as KNEE correction, gamma correction, and color correction, on the image signal that is input from the imaging unit 962. The signal processing unit 963 outputs to the image processing unit 964 the image data that goes through the camera signal processing.

The image processing unit 964 codes the image data that is input from the signal processing unit 963 and generates the code data. Then, the image processing unit 964 outputs the generated code data to the external interface unit 966 or the medium drive 968. Furthermore, the image processing unit 964 decodes the code data that is input from the external interface unit 966 or the medium drive 968, and generates the image data. Then, the image processing unit 964 outputs the generated image data to the display unit 965. Furthermore, the image processing unit 964 may output to the display unit 965 the image data that is input from the signal processing unit 963 and display the image on the display unit 965. Furthermore, the image processing unit 964 may output to the display unit 965 the display data that is obtained from the OSD 969 and superimpose the display data onto the image.

The OSD 969, for example, generates a GUI image, such as a menu, a button, or a cursor, and outputs the generated image to the image processing unit 964.

The external interface unit 966 is configured, for example, as a USB input/output terminal. The external interface unit 966, for example, connects to the imaging apparatus 960 and a printer when printing the image. Furthermore, the drive is connected to the external interface unit 966 if necessary. For example, a removable medium, such as a magnetic disk or an optical disc, is mounted in the drive, and a program that is read from the removable medium can be installed in the imaging apparatus 960. Additionally, the external interface unit 966 may be configured as a network interface that is connected to a network, such as a LAN or the Internet. That is, the external interface unit 966 plays a role as a transmission unit in the imaging apparatus 960.

The recording medium, which is mounted in the medium drive 968, for example, may be an arbitrary removable medium, such as a magnetic disk, a magneto-optical disc, an optical disc, or a semiconductor memory, which is readable and writable. Furthermore, the recording medium may be fixedly mounted in the medium drive 968. For example, a non-portable storage unit may be configured such as a built-in hard drive or a solid state drive (SSD).

The control unit 970 has a processor such as a CPU, and a memory such as a RAM and ROM. The memory stores a program that is executed by the CPU, program data, and the like. The CPU reads and executes, for example, the program that is stored in the memory when starting the imaging apparatus 960. By executing the program, the CPU controls, for example, operation of the imaging apparatus 960 according to an operation signal that is input from the user interface unit 971.

The user interface unit 971 is connected to the control unit 970. The user interface unit 971, for example, has buttons and switches that a user uses to operate the imaging apparatus 960. The user interface unit 971 detects the operation by the user through such constituent elements, and thus generates the operation signal and outputs the generated operation signal to the control unit 970.

In the imaging apparatus 960 with this configuration, the image processing unit 964 has the same function as the image coding device 100 (refer to FIG. 8) described above according to the embodiment. Accordingly, the reduction in image quality due to the coding of the image in the imaging apparatus 960 can be suppressed.

Moreover, in the present specification, a system refers to an entire system that is configured from multiple devices.

Furthermore, the configuration described above as having one device (or processing unit) may be changed to one that has multiple devices (or processing units). Conversely, the configuration described above as having the multiple devices (or processing units) may be changed to one that has one device (processing unit). Furthermore, of course, a configuration other than the one described above may be added to the configuration of each device (or each processing unit). Moreover, when the configurations and operations are substantially the same as the entire system, one part of a configuration of a certain device (or a certain processing unit) may be included in a configuration of another device (or another processing unit). Basically, the embodiments of the present technology are not limited to the embodiments described above and various modifications can be made within a scope that does not depart from the gist of the present technology.

Moreover, the present technology can have the following configurations as well.

(1) An image processing device including: a division unit that divides each picture of image data into multiple arrangements; multiple coding units, each of which codes the pictures in the mutually-different arrangements that result from the division by the division unit; and a composition unit that composites streams in the arrangements, which are obtained by each of the multiple coding units coding each picture, in which when coding a current picture, the coding unit performs inter-prediction using a first global motion vector (GMV) that is derived from motion information on a portion whose processing is finished, of a picture that precedes the current picture in the image data that is present before being divided by the division unit and whose processing is in progress in a different coding unit.

(2) The image processing device according to any one of (1) and (3) to (16), in which if processing of a picture, among pictures that are nearest a reference distance for a GMV, that is nearest the current picture is in progress in the different coding unit, the coding unit derives the first GMV from the motion information on the portion whose processing is finished, of the picture.

(3) The image processing device according to any one of (1), (2), and (4) to (16), in which if the processing of a picture corresponding to the first GMV is in progress at a point in time for starting the coding of the current picture, the coding unit derives the first GMV from the motion information on the portion whose processing is finished.

(4) The image processing device according to (1) to (3) and (5) to (16), in which the coding unit derives a search area offset of the inter-prediction using the first GMV.

(5) The image processing device according to (1) to (4) and (6) to (16), in which the coding unit derives the search area offset using a GMV that is derived from the motion information on an entire picture that precedes a picture corresponding to the first GMV, in the image data that is present before being divided by the division unit and whose coding is finished in the coding unit itself or the different coding unit.

(6) The image processing device according to any one of (1) to (5) and (7) to (16), in which the coding unit derives the search area offset using both of a second GMV that is derived from the motion information on a portion corresponding to the portion whose processing is finished, of the picture corresponding to the first GMV, of the picture whose coding is finished, and a third GMV that is derived from the motion information on a portion different from the portion corresponding to the portion whose processing is finished, as the GMV that is derived from the motion information on the entire picture.

(7) The image processing device according to any one (1) to (6) and (8) to (16), in which the coding unit derives the search area offset by adding a difference between the first GMV and the second GMV to an average of the second GMV and the third GMV.

(8) The image processing device according to any one of (1) to (7) and (9) to (16), in which the division unit divides the picture of the image data into two arrangements, an even-numbered picture arrangement and an odd-numbered picture arrangement, in which each of the coding units codes each picture in the arrangement corresponding to the coding unit itself during a vertical synchronization period for two pictures, in which at the time of the coding, each of the coding units derives the first GMV from the motion information on an upper half of a picture that precedes the current picture in the image data that is present before being divided by the division unit and whose processing is in progress in the different coding unit, and derives the second GMV from the motion information on an upper half of a picture that precedes the picture corresponding to the first GMV in the image data that is present before being divided by the division unit and whose coding is finished in the coding unit itself and the different coding unit, and the third GMV from the motion information on a lower half of the picture, in which each of the coding units derives the search area offset of the current picture using the first GMV to the third GMV and performs the inter-prediction using the derived search area offset, and in which the composition unit composites a stream in the even-numbered picture arrangement and a stream in the odd-numbered picture arrangement, which are generated by each coding unit, and generates an output stream.

(9) The image processing device according to any one of (1) to (8) and (10) to (16), in which the coding unit derives the first GMV from the motion information on the upper half of a picture whose processing is in progress when starting the coding of the current picture and that precedes the current picture by one picture, and derives the second GMV from the motion information on an upper half of a picture whose processing is in progress when starting the coding of the current picture and that precedes the current picture by two or more pictures and the third GMV from the motion information on a lower half of the picture.

(10) The image processing device according to any one of (1) to (9) and (11) and (16), in which the coding unit derives the second GMV from the motion information on an upper half of a picture that precedes the current picture by three pictures, and the third GMV from the motion information on a lower half of the picture.

(11) The image processing device according to any one of (1) to (10) and (12) to (16), in which the coding unit derives a first starting point that is a starting point for a speculative execution point of the inter-prediction for a portion corresponding to the portion whose processing is finished, of the picture corresponding to the first GMV, of the current picture using the first GMV.

(12) The image processing device according to (1) to (11) and (13) to (16), in which the coding unit sets the first GMV to be the first starting point.

(13) The image processing device according to any one of (1) to (12) and (14) to (16), in which after processing a portion corresponding to the portion whose processing is finished, of a picture corresponding to the first GMV, of the current picture, using a second GMV that is derived from the motion information on a portion different from the portion corresponding to the portion whose processing is finished, of the picture corresponding to the first GMV, the coding unit derives a second starting point that is a starting point for a speculative execution point of the inter-prediction for a portion corresponding to the different portion of the picture corresponding to the first GMV is derived, of the current picture.

(14) The image processing device according to any one of (1) to (13), (15), and (16), in which the coding unit sets the second GMV to be the second starting point.

(15) The image processing device according to any one of (1) to (14) and (16), in which the division unit divides the picture of the image data into two arrangements, an even-numbered picture arrangement and an odd-numbered picture arrangement, in which each of the coding units codes each picture in the arrangement corresponding to the coding unit itself during a vertical synchronization period for two pictures, in which when starting the coding processing on the current picture, each of the coding units derives the first GMV from the motion information on an upper half of a picture that precedes the current picture in the image data that is present before being divided by the division unit and whose processing is in progress in the different coding unit, derives the first starting point using the first GMV, performs the inter-prediction on an upper half of the current picture using the first starting point, derives the second GMV from the motion information on a lower half of a picture corresponding to the first GMV, whose processing is finished after processing the upper half, derives the second starting point using the first GMV, and performs the inter-prediction on the lower half of the current picture using the second starting point, and in which the composition unit composites a stream in the even-numbered picture arrangement and a stream in the odd-numbered picture arrangement, which are generated by each coding unit, and generates an output stream.

(16) The image processing device according to any one (1) to (15), in which the coding unit derives the first GMV from the motion information on an upper half of a picture that precedes the current picture by one picture, and the second GMV from the motion information on a lower half of the picture.

(17) An image processing method including: dividing each picture of image data into multiple arrangements; coding the picture in each of the arrangements that result from the division; performing an inter-prediction on a current picture using a first global motion vector (GMV) that is derived from motion information on a portion whose processing is finished, of a picture that precedes the current picture in the image data that is present before being divided and whose processing is in progress in a different coding unit in coding the each picture; and compositing streams in the arrangements, which are obtained by coding each picture.

(18) A program for causing a computer to perform: dividing each picture of image data into multiple arrangements; coding the picture in each of the arrangements that result from the division; performing an inter-prediction on a current picture using a first global motion vector (GMV) that is derived from motion information on a portion whose processing is finished, of a picture that precedes the current picture in the image data that is present before being divided and whose processing is in progress in a different coding unit in coding the each picture; and compositing streams in the arrangements, which are obtained by coding each picture.

(19) An imaging apparatus including: an imaging unit that images a photographic subject; a division unit that divides each picture of image data, which is obtained by the imaging input imaging the photographic subject, into multiple arrangements; multiple coding units, each of which codes the pictures in the mutually-different arrangements that result from the division by the division unit; and a composition unit that composites streams in the arrangements, which are obtained by each of the multiple coding units coding each picture, in which when coding a current picture, the coding unit performs inter-prediction using a first global motion vector (GMV) that is derived from motion information on a portion whose processing is finished, of a picture that precedes the current picture in the image data that is present before being divided by the division unit and whose processing is in progress in a different coding unit.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   circuitry configured to:
   divide pictures of image data into multiple arrangements;
   code the pictures in each of the arrangements that result from the division;
   code, in a first coding, a current picture by performing an inter-prediction on the current picture using a first global motion vector (GMV) that is derived from motion information on a portion whose processing is finished of a picture that precedes the current picture, in the image data that is present before the division, and whose processing is in progress in a second coding which is a different coding from the first coding;
   derive a search area offset of the inter-prediction using the first GMV;
   derive the search area offset using a GMV that is derived from motion information on an entire picture that precedes a picture corresponding to the first GMV, in the image data that is present before the division, and whose coding is finished in the first coding or the second coding; and
   composite streams from the arrangements, which are obtained by coding each of the pictures.

2. The image processing device according to claim 1, wherein if processing of a picture, among pictures that are nearest a reference distance for a GMV, that is nearest the current picture is in progress in the second coding, the circuitry is configured to derive the first GMV from the motion information on the portion whose processing is finished, of the picture whose processing is in progress.

3. The image processing device according to claim 2, wherein if the processing of a picture corresponding to the first GMV is in progress at a point in time for starting the coding of the current picture, the circuitry is configured to derive the first GMV from the motion information on the portion whose processing is finished.

4. The image processing device according to claim 1, wherein the circuitry is configured to derive the search area offset using both of a second GMV that is derived from motion information on a portion corresponding to the portion whose processing is finished, of the picture corresponding to the first GMV, of the picture whose coding is finished, and a third GMV that is derived from motion information on a portion different from the portion corresponding to the portion whose processing is finished, of the picture whose coding is finished, as the GMV that is derived from the motion information on the entire picture.

5. The image processing device according to claim 4, wherein the circuitry is configured to derive the search area offset by adding a difference between the first GMV and the second GMV to an average of the second GMV and the third GMV.

6. The image processing device according to claim 5, wherein the circuitry is configured to:
   divide the pictures of the image data into two arrangements, an even-numbered picture arrangement and an odd-numbered picture arrangement,
   code each picture during a vertical synchronization period for two pictures,
   in the first coding, derive the first GMV from motion information on an upper half of a picture that precedes the current picture, in the image data that is present before the division, and whose processing is in progress in the second coding, and derive the second GMV from motion information on an upper half of a picture that precedes the picture corresponding to the first GMV, in the image data that is present before the division, and whose coding is finished in the first coding and the second coding, and the third GMV from motion information on a lower half of the picture,
   derive the search area offset of the current picture using the first GMV to the third GMV,
   perform the inter-prediction using the derived search area offset,
   composite a stream from the even-numbered picture arrangement and a stream from the odd-numbered picture arrangement, which are generated by each of the first and second coding, and
   generate an output stream.

7. The image processing device according to claim 6, wherein the circuitry is configured to derive the first GMV from motion information on an upper half of a picture whose processing is in progress when starting the coding of the current picture and that precedes the current picture by one picture, and derives the second GMV from motion information on an upper half of a picture whose processing is finished when starting the coding of the current picture and that precedes the current picture by two or more pictures, and the third GMV from motion information on a lower half of the picture.

8. The image processing device according to claim 7, wherein the circuitry is configured to derive the second GMV from motion information on an upper half of a picture that precedes the current picture by three pictures, and the third GMV from motion information on a lower half of the picture.

9. The image processing device according to claim 1, wherein the circuitry is configured to derive a first starting point that is a starting point for a speculative execution point of the inter-prediction for a portion corresponding to the portion whose processing is finished, of the picture corresponding to the first GMV, of the current picture using the first GMV.

10. The image processing device according to claim 9, wherein the circuitry is configured to set the first GMV to be the first starting point.

11. The image processing device according to claim 9, wherein after processing a portion corresponding to the portion whose processing is finished, of a picture corresponding to the first GMV, of the current picture, using a second GMV that is derived from motion information on a portion different from the portion corresponding to the portion whose processing is finished, of the picture corresponding to the first GMV, the circuitry is configured to derive a second starting point that is a starting point for a speculative execution point of the inter-prediction for a portion corresponding to the different portion of the picture corresponding to the first GMV, of the current picture.

12. The image processing device according to claim 11, wherein the circuitry is configured to set the second GMV to be the second starting point.

13. The image processing device according to claim 11, wherein the circuitry is configured to:
divide the pictures of the image data into two arrangements, an even-numbered picture arrangement and an odd-numbered picture arrangement,
code each picture during a vertical synchronization period for two pictures,
wherein when starting the first coding, derive the first GMV from motion information on an upper half of a picture that precedes the current picture, in the image data that is present before the division, and whose processing is in progress in the second coding, derive the first starting point using the first GMV, perform the inter-prediction on an upper half of the current picture using the first starting point, derive the second GMV from motion information on a lower half of a picture corresponding to the first GMV, whose processing is finished after processing the upper half, derive the second starting point using the first GMV, and perform the inter-prediction on the lower half of the current picture using the second starting point, and
composite a stream from the even-numbered picture arrangement and a stream from the odd-numbered picture arrangement, which are generated by each of the first and second coding, and generate an output stream.

14. The image processing device according to claim 13, wherein the circuitry is configured to derive the first GMV from motion information on an upper half of a picture that precedes the current picture by one picture, and the second GMV from motion information on a lower half of the picture.

15. An image processing method comprising:
dividing pictures of image data into multiple arrangements;
coding the pictures in each of the arrangements that result from the division;
coding, in a first coding, a current picture by performing an inter-prediction on the current picture using a first global motion vector (GMV) that is derived from motion information on a portion whose processing is finished of a picture that precedes the current picture, in the image data that is present before the division, and whose processing is in progress in a second coding which is a different coding from the first coding;
deriving a search area offset of the inter-prediction using the first GMV;
deriving the search area offset using a GMV that is derived from motion information on an entire picture that precedes a picture corresponding to the first GMV, in the image data that is present before the division, and whose coding is finished in the first coding or the second coding; and
compositing streams in from arrangements, which are obtained by coding each picture.

16. A program stored on a non-transitory computer readable medium causing a computer to act as a device to perform:
dividing pictures of image data into multiple arrangements;
coding the pictures in each of the arrangements that result from the division;
coding, in a first coding, a current picture by performing an inter-prediction on the current picture using a first global motion vector (GMV) that is derived from motion information on a portion whose processing is finished of a picture that precedes the current picture, in the image data that is present before the division, and whose processing is in progress in a second coding which is a different coding from the first coding;
deriving a search area offset of the inter-prediction using the first GMV;
deriving the search area offset using a GMV that is derived from motion information on an entire picture that precedes a picture corresponding to the first GMV, in the image data that is present before the division, and whose coding is finished in the first coding or the second coding; and
compositing streams from the arrangements, which are obtained by coding each picture.

17. An imaging apparatus comprising:
circuitry configured to:
image a photographic subject to obtain image data;
divide pictures of the image data into multiple arrangements;
code the pictures in each of the arrangements that result from the division;
code, in a first coding, a current picture by performing an inter-prediction on the current picture using a first global motion vector (GMV) that is derived from motion information on a portion whose processing is finished of a picture that precedes the current picture, in the image data that is present before the division, and whose processing is in progress in a second coding which is a different coding from the first coding;
derive a search area offset of the inter-prediction using the first GMV;
derive the search area offset using a GMV that is derived from motion information on an entire picture that precedes a picture corresponding to the first GMV, in the image data that is present before the division, and whose coding is finished in the first coding or the second coding; and
composite streams in from arrangements, which are obtained by coding each picture.

* * * * *